United States Patent
Samanthapudi et al.

(10) Patent No.: US 11,222,291 B2
(45) Date of Patent: Jan. 11, 2022

(54) METHOD AND SYSTEM FOR EFFICIENT AND COMPREHENSIVE PRODUCT CONFIGURATION AND SEARCHING

(71) Applicant: ValueMomentum, Inc., Piscataway, NJ (US)

(72) Inventors: Gopi Mani R. Samanthapudi, Hillsborough, NJ (US); Umadevi Gogineni, Hyderabad (IN); Gopikrishna Gade, Hillsborough, NJ (US); Anant Iyer, Westfield, NJ (US); Venkatesh Sankaranarayana, Hyderabad (IN); V S Sudhir Varma Mudundi, Hyderabad (IN)

(73) Assignee: ValueMomentum, Inc., Piscataway, NJ (US)

( * ) Notice: Subject to any disclaimer, the term of this patent is extended or adjusted under 35 U.S.C. 154(b) by 0 days.

(21) Appl. No.: 16/456,962

(22) Filed: Jun. 28, 2019

(65) Prior Publication Data
US 2020/0065725 A1  Feb. 27, 2020

Related U.S. Application Data

(63) Continuation of application No. 14/750,016, filed on Jun. 25, 2015, now Pat. No. 10,380,527.

(60) Provisional application No. 62/016,995, filed on Jun. 25, 2014.

(51) Int. Cl.
*G06Q 30/00* (2012.01)
*G06Q 10/06* (2012.01)
*G06Q 30/06* (2012.01)

(52) U.S. Cl.
CPC ..... *G06Q 10/0633* (2013.01); *G06Q 30/0621* (2013.01)

(58) Field of Classification Search
None
See application file for complete search history.

(56) References Cited

U.S. PATENT DOCUMENTS

| | | | |
|---|---|---|---|
| 8,290,822 B2 | 10/2012 | Gade et al. | |
| 8,590,011 B1 * | 11/2013 | Legault | H04L 63/105 726/3 |
| 8,788,295 B1 * | 7/2014 | Wargin | G06Q 40/08 705/4 |
| 2003/0158760 A1 * | 8/2003 | Kannenberg | G06Q 40/02 705/4 |
| 2008/0059942 A1 | 3/2008 | Brown et al. | |
| 2010/0145746 A1 | 6/2010 | Gerth et al. | |
| 2011/0283252 A1 | 11/2011 | Chen et al. | |
| 2012/0110595 A1 * | 5/2012 | Reitman | G06F 30/00 719/313 |
| 2012/0151377 A1 | 6/2012 | Schultz et al. | |

(Continued)

*Primary Examiner* — Mila Airapetian
(74) *Attorney, Agent, or Firm* — Lerner, David, Littenberg, Krumholz & Mentlik, LLP

(57) ABSTRACT

The present application describes systems and methods for defining a configurable project. In this regard, a first component in a first configurable project may be defined. The first configurable project may then be published. Subsequently, a second configurable project is assigned to a user. In defining a second component, the second component may reference the first component of the first configurable project. If the first component is modified, a notification may be generated in the second configurable project.

20 Claims, 34 Drawing Sheets

(56) References Cited

U.S. PATENT DOCUMENTS

| | | | |
|---|---|---|---|
| 2012/0254090 A1* | 10/2012 | Burris | G06N 5/027 |
| | | | 706/47 |
| 2013/0054613 A1 | 2/2013 | Bishop | |
| 2013/0144566 A1* | 6/2013 | De Biswas | G06T 17/005 |
| | | | 703/1 |
| 2015/0026755 A1* | 1/2015 | Lehmann | G06F 21/62 |
| | | | 726/1 |
| 2015/0178851 A1* | 6/2015 | Dutt | G06Q 40/08 |
| | | | 705/4 |

* cited by examiner

METHOD AND SYSTEM FOR EFFICIENT AND COMPREHENSIVE PRODUCT CONFIGURATION AND SEARCHING

CROSS-REFERENCE TO RELATED APPLICATIONS

The present application is a continuation of U.S. patent application Ser. No. 14/750,016, filed Jun. 25, 2015, which claims the benefit of the filing date of U.S. Provisional Patent Application No. 62/016,995, filed Jun. 25, 2014, the disclosures of which are hereby incorporated herein by reference.

BACKGROUND

As e-commerce continues to grow and expand, people prefer to tailor the tangible or intangible product to their needs and/or preferences. In this regard, most retailers and service providers allow people to configure products according to these attributes. However, to offer a variety of products with configurable or selectable attributes, an online merchant or service provider may maintain a database of attributes and products. However, as the number of offered products and selectable attributes increases, the amount of effort to manage and process product requests also increases, sometimes exponentially. As the effort required on the merchant side increases, the amount of time spent waiting to view a configured product also increases. Hence, current product configuration systems are insufficient for complex configurable products because of their inability to scale with increases to inventory or changes in the number of attributes for configuring a product.

Moreover, certain configurable products may have features that are only applicable to certain channels of commerce (e.g., in-person with an agent, via the internet, over the phone, etc.), to certain jurisdictions, or certain companies, or for a certain period, etc. For example, in the context of insurance policies, certain features may only be available to a certain date. In another example, when configuring a bike, disc brakes may only be available on certain models or up to a certain date. In this regard, as the number of features increase, there is greater difficulty in managing the versions and availability of features. Thus, current complex product configuration systems lack the ability to manage versions in a fast and secure manner.

Additionally, in financial services industries, such as insurance, where product options and features change based on jurisdiction, managing variations of products and their versions increases the complexity of the solutions. In this regard, current products available are inadequate for managing the complexity of production variations and their versions.

BRIEF SUMMARY

The current application describes a computer-implemented system for defining a configurable product, which includes product parts, features, and/or options that refer to other configurable products. The system may include a non-transitory, computer-readable medium and one or more processors in communication with the non-transitory readable medium. The non-transitory, computer readable medium may store computer-executable instructions that, when executed by the one or more processors, generate a configurable product based on multiple plans which are interdependent. Several products may refer to one another to derive additional products. Based on this interdependency, the processor is capable of executing the product plans to derive the product for a user.

In this regard, an administrator may create a business object model or a product model with a set of guidelines and structure to generate a first configurable product. A modeler may use the object model or the product model in accessing a configuration server. Using the configuration server the modeler may define a first component (i.e., part, feature, or option) in the first configurable product. The first configurable product may then be published or made available in a library or repository. The same, or possibly different, administrator may then create a second business object model or a product model to generate a second configurable product. The same, or possible different, modeler may then begin generating the second configurable product. Accordingly, the modeler may define a second component (e.g., part, feature, or option) in the second configurable project such that the second component refers to the first component in the first configurable project. If/when the first component changes or expires, the system may generate a notification or alert in the second configurable product indicating that the first component has changed.

In other implementations, the present application provides for a computer-implemented method for defining a configurable product, which includes product parts, features, and/or options that refer to other configurable products. As described above, an administrator may create a business object model or a product model with a set of guidelines and structure to generate a first configurable product. A modeler may use the object model or the product model in accessing a configuration server. Using the configuration server, the modeler may define a first component (i.e., part, feature, or option) in the first configurable product. The first configurable product may then be published or made available in a library or repository. The same, or possibly different, administrator creates a second business object model or a product model to generate a second configurable product. The same, or possibly different, modeler may then begin generating the second configurable product. Accordingly, the modeler may define a second component (e.g., part, feature, or option) in the second configurable project such that the second component refers to the first component in the first configurable project. If/when the first component changes or expires, the system may generate a notification or alert in the second configurable product indicating that the first component has changed.

Another feature of the methods and systems described herein is the organization of data in the product models and the subsequent searching performed based on the organization and indices. As noted above, an administrator may define the structure of the product model. In this regard, the product model may be a structural definition (plan) that includes the parts, features, coverages, and/or other aspects. The modeler may define the parts, features, clauses, coverages and other aspects within the plan model. Once a plan model is defined, the products, parts, features, clauses, options and/or other aspects may be organized to index in to a hierarchical structure, such as a tree structure, based on the domain configurations for each of the elements. After defining the hierarchical structure, such as the tree structure, a supporting algorithm can effectively search for the right version of an element based on the domain configurations and the search request. In this regard, the system may provide the appropriate version of the component being searched in accordance with the domain configurations and the search terms. In this regard, the system provides a more efficient way to organize components included in a configurable product and a faster way to search for the components included in the configurable product.

DETAILED DESCRIPTION

Figure 1:
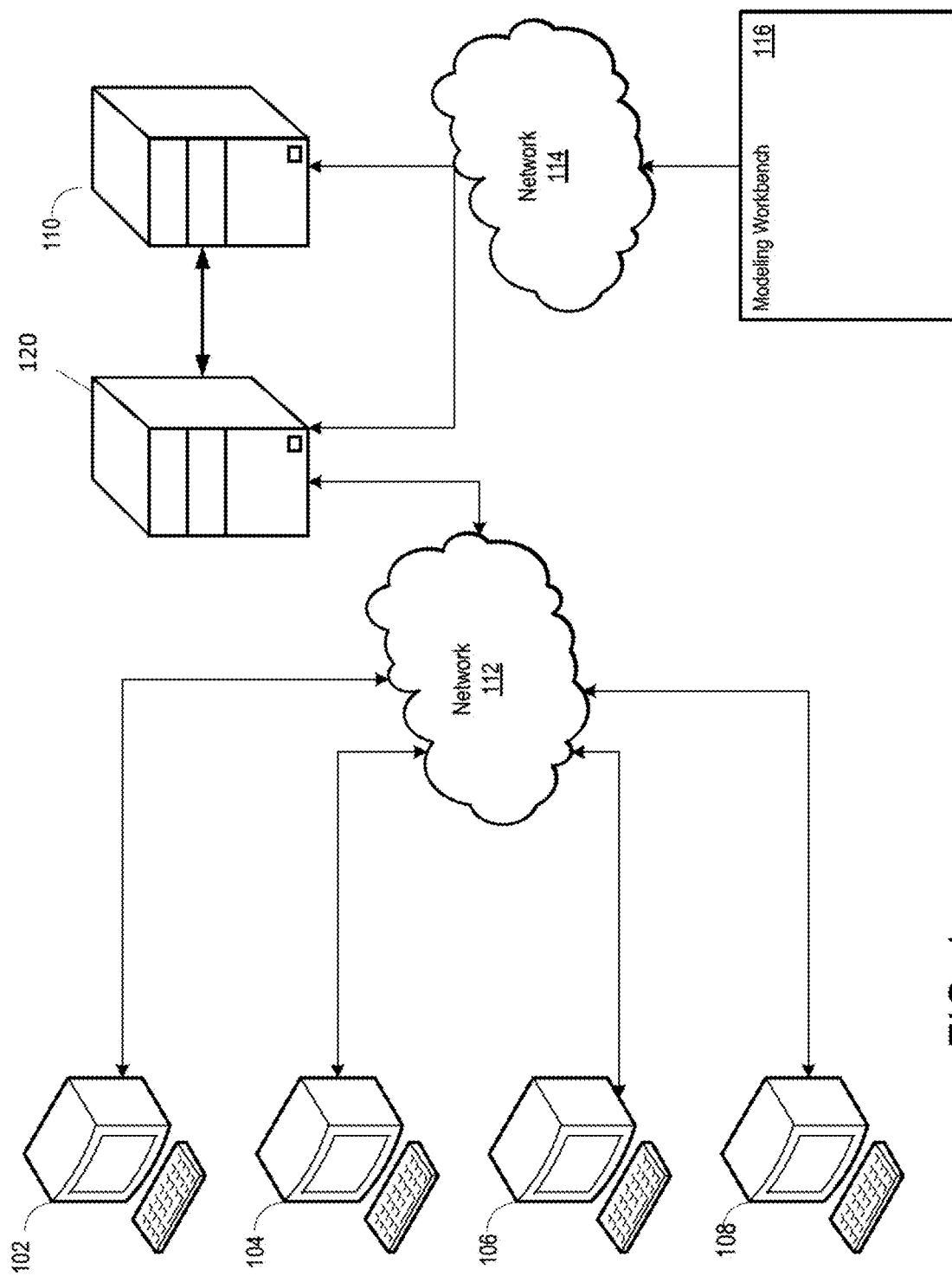
FIG. 1 illustrates an overview of a product configuration system according to one example described herein.

FIG. 1 illustrates one example of client devices 102-108 in communication with an enterprise server 120 via network 112. The client devices 102-108 may be any type of client devices, such as mobile devices, desktop computers, laptop computers, netbooks, tablet device, or any other type of client device. Examples of mobile devices include personal display assistants, smartphones, cellular phones, portable digital music players, or any other type of mobile device. The network 112 may be a Wide Area Network ("WAN") such as the Internet, a Local Area Network ("LAN") such as an intranet, or a combination of WANs and LANs.

The client devices 102-108 may request to search and/or configure one or more configurable products from the enterprise server 120. The one or more configurable products may be any type of product, including tangible or intangible products. A tangible product may be a physical object or an object discernable by touching. Examples of tangible products include software products, sporting equipment, such as bicycles, baseballs, and basketballs, kitchen appliances, automobiles, or any other tangible products now known or later developed. An intangible product may be non-physical object, such as a subscription or service. Examples of intangible products include cable television service subscriptions, insurance policies such as property and casualty (P&C) insurance policies and health insurance policies, magazine subscriptions, a vehicle repair service, a home cleaning service, or any other intangible product now known or later developed.

The enterprise server 120 is in communication with a product configuration server 110. The enterprise server 120 and the product configuration server 110 may be located at the same site or communicate via a network. According to some implementations, the enterprise server 120 and the product configuration server 110 may be located on the same physical device. The product configuration server 110 may be connected to a modeling workbench 116 via a network 114. According to further embodiments, the enterprise server 120 may bypass the product configuration server 110, and interact directly with the workbench 116.

The product configuration server 110 is operative to publish one or more configurable products. In one implementation, the product configuration server 110 may be an insurance carrier to provide insurance agents configurable products which may be offered to the client devices 102-108. In this implementation, customers may use the client devices 102-108 to purchase configurable products sold by the insurance carrier through an agent.

In another implementation, the product configuration server 110 is a corporate intranet server operative to provide configurable products to the enterprise server 120. In this implementation, the users of the client devices 102-108 may be employees of a corporation using the enterprise server 120. Other implementations of the product configuration server 110 are also possible, such as providing a website for a beverage vendor, a website for a clothing vendor, or other type of website. In other embodiments, the product configuration server 110 may be a cloud server in a cloud infrastructure capable of hosting at least one tenant. Preferably, the cloud server hosts multiple tenants. In this regard, the products may be shared amongst multiple tenants of a cloud server according to their product lines and business models.

For example, Insurance Co. 1 and Insurance Co. 2 may access the product configuration server 110. In this regard, Insurance Co. 2 may develop an auto insurance policy. The product configuration server 110 would provide a business object model or product model to Insurance Co. 2 to develop their auto insurance policy. A modeler at Insurance Co. 2 would use the model to write the auto insurance policy. In writing the auto insurance policy, the modeler may include parts, features, clauses, and/or options from an auto insurance policy from Insurance Co. 1. Additionally, the modeler may include parts, features, clauses, and/or options from generic, nationwide auto insurance policies maintained in repositories at the product configuration server 110. Further, the modeler may configure parts, features, clauses and/or options for Insurance Co. 2's auto insurance policy. The product configuration server 110 may compile parts, features, or options that it offers to subscribers, such as Insurance Co. 1 and Insurance Co. 2. Thus, Insurance Co. 2 may compile a product model that includes parts, features, and/or options configured by itself, Insurance Co. 1, or the product configuration server 110. Furthermore, Insurance Co. 2 may receive updates, notifications or alerts when one of the parts, features, and/or options referred to in its model plan changes or expires. In the foregoing example Insurance Co. 1 and Insurance Co. 2 may be the same insurance company, such as different divisions or groups within a single insurance company. Additionally, Insurance Co. 1 and Insurance Co. 2 may be different insurance companies.

In another implementation of the product configuration server 110 being implemented as a cloud server, an insurance company may have a choice of selecting and/or choosing one or more plans from the library of published plans shared by multiple tenants on the cloud server. A tenant on the cloud server could be an insurance company or an independent user. One or more users may be assigned to a tenant and all the users belonging to a tenant may collaborate to develop a model for the tenant. Users across different tenants may also collaborate and develop joint plans which can be used for a competitive advantage. Plans shared in a multi-tenancy model may be public, private, or selective (i.e., sharing between known tenants, limiting plans that can be shared, selecting who can share in which plans, etc.). Multiple variants of a business model are possible. Additionally, components of the plan models may be shared as well. That is, a tenant may share a part or feature from a plan instead of sharing the complete plan model. The shared models and plans may be offered by the creator to other tenants at a cost or free depending on the business model.

The solution platform enables development of a cloud environment where partners or tenants can build models and share models at a price similar. In this model, the sharing and offering is on the internet platform that a modeler develops using the product modeling tools and platform provided by the current application. Additionally, the solution platform may translate to an "app model" so users may be able to access the plan development tools from mobile devices. In some examples, the user/tenant may be an independent consultant who is an expert in the actuary and underwriting area. In this regard, independent consultants may build business objects and product models which can be published in the platform environment or library to share and sell to other users/tenants in the cloud computing environment.

In another implementation, pre-certified models from $3^{rd}$ party content providers may be made available on the cloud computing environment. Accordingly, various pre-certified models may be made available to tenants according to the terms of their subscription. The product configuration system may allow extensions to be included on the models from $3^{rd}$ party content providers to allow a tenant subscriber to tailor the model to their specific needs and preferences. In this regard, the model from $3^{rd}$ party providers can be loaded as a core model. Each tenant can subscribe to one or more models from the core model. Based on the subscription plan, a tenant may extend and make their changes, which may be republished to other tenants for reference and subscriptions. Tenant changes and updates can be managed as plans which can drive overrides and references. This approach enables a flexible method to share proprietary and industry models, as well as allows models to be shared across different tenants or companies. The offerings and options around these models may change the way product and price plans are managed in financial services industries.

The product configuration server 110 and the enterprise server 120 may communicate through an intranet (not shown) or another type of public network, such as the Internet. Additionally, the product configuration server 110 and enterprise server 120 may be directly connected. For example, one or more client devices 102-108 may transmit a request for one or more configurable products to the enterprise server 120. The enterprise server 120 then contacts the product configuration server 110 to retrieve the configurable products. In response, the product configuration server 110 may provide one or more configurable products to the enterprise server 120, which subsequently displays the one or more configurable products to the client devices 102-108. Moreover, a software application, such as a portal or dashboard, may be available from the product configuration server 110 to facilitate the display and configuration of the configurable products displayed by the enterprise server 120. In this regard, the software application may be a software extension to an existing application used to display the configurable products offered by the product configuration server 110, such as a software extension for a network browser. As explained below, the software extension may be a plug-in for an Internet browser, such as Mozilla Firefox, available from the Mozilla Foundation, located in Mountain View, Calif.

Although FIG. 1 illustrates that the client devices 102-108 are in communication with an enterprise server 120, the client devices 102-108 may be in communication with multiple enterprise servers (not shown) via the network 112. Additionally, a single product configuration server 110 may include multiple product configuration servers. Furthermore, the client devices 102-108 may be in communication with each other. In one implementation, a client device 102-108 may be a product configuration server 110. Similarly, in another implementation, a product configuration server 110 may be a client device 102-108. In addition, an enterprise server 120 and a product configuration server 110 may be co-located on a single server.

As noted above, the product configuration server 110 may also be in communication with a modeling workbench 116 via a network 114. As with network 112, the network 114 may be a WAN, a LAN, or a combination of WANs and LANs. Moreover, the network 114 may be the network 112.

The modeling workbench 116 is operative to define one or more aspects used in displaying or preparing a configurable product. For example, the modeling workbench 116 may include a modeling environment operative to define various models, such as product models, rule models, and/or pricing models. Moreover, the modeling workbench 116 may include intuitive templates to capture configurable product features, parts and potential relations between one or more configurable products. Although FIG. 1 illustrates that the modeling workbench 116 is in communication with the product configuration server 110, the modeling workbench 116 may be in communication with one or more alternative or additional systems and/or components, such as one or more enterprise servers 120. Additional details regarding the modeling workbench 116 are further explained below.

Figure 2:
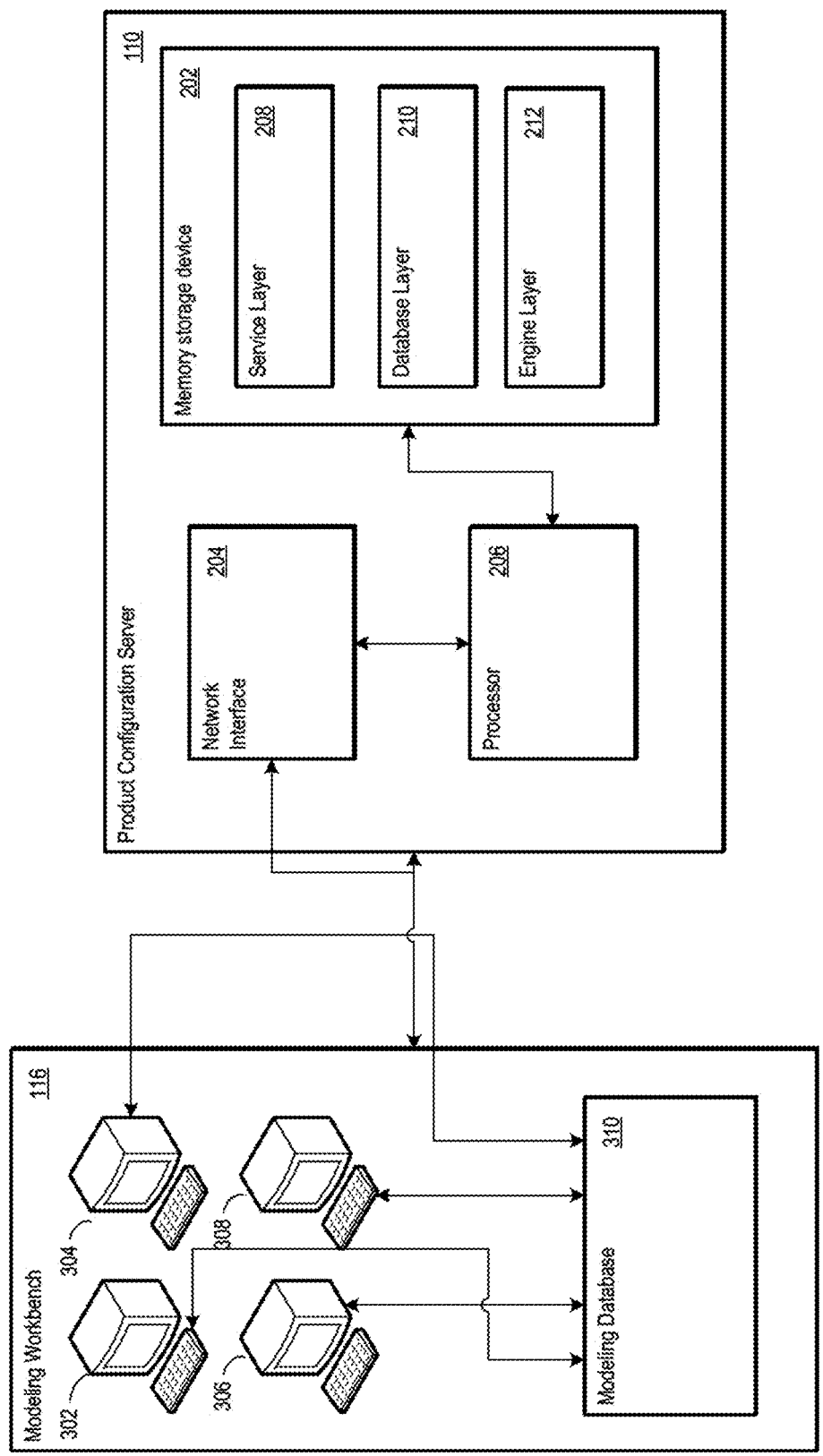
FIG. 2 illustrates one example of a modeling workbench in communication with a product configuration server.

FIG. 2 illustrates an example of the modeling workbench 116 in communication with the product configuration server 110. In general, the modeling workbench 116 is a modeling environment operative to define configurable products, one or more product configuration rules, and one or more pricing models for the configurable products. The product configuration server 110 may include a network interface 2014, one or more processors 206, and a memory storage device 202. The memory storage device 202 may store a service layer 208, database layer 210, and/or engine layer 212. The modeling workbench 116 may publish product model information including hierarchies between various parts and features, and references between various product models to a configuration server. The product configuration server 110 may process this data and create a configured product structure which may be shared with clients at run time. The configurable product structures may be generated upfront, so they are ready for search and exchange. Alternatively, the configurable product structures may be created at a transaction time. Engine layer 212 is a module which executes the configurations and generates the exchangeable structure for clients. Database 210 may store the product definitions and configured products which can be searched by services. In some embodiments, product configuration server 110 may not be needed, as the modeling workbench 116 may exchange product definitions and rules with the enterprise systems 120. As such, the enterprise systems 120, may process the definitions and rules to support client systems.

In one implementation, the modeling workbench 116 may include one or more client devices 302-308 in communication with a modeling database 310. The modeling database 310 is one example of a modeling repository. The modeling database 310 is operative to store one or more modeling database records that define models for the configurable products, models for one more product configuration rules, and one or more pricing models. Although the modeling database is shown with the modeling workbench 116, one of ordinary skill in the art will recognize that the modeling database may be located on the product configuration server 110.

Moreover, the modeling workbench 116 may assist in the generation and management of one or more versions for a given model. Hence, any model defined by the modeling workbench 116 may have multiple versions. Versions, as described herein, may refer to components that are valid for certain periods or have expiration dates. Additionally, versions may also depend on other factors, such as jurisdiction, commerce channel, etc.

The modeling database 310 may leverage one or more syntaxes for implementing the one or more modeling database records. For example, the modeling database 310 may leverage a meta-language syntax that comprises at least one element of data content and at least one element identifier that describes the type of content of the at least one element of data content. Moreover, the meta-language syntax may include an extensible markup language ("XML"). In addition, the modeling database 310 may recognize additional languages, such as a Structured Query Language ("SQL").

The modeling workbench 116 may be used to define product configuration models for one or more product configuration rule types. In general, a product configuration rule may define the permissible and impermissible configurations for a configurable product. A product configuration rule may also define permissible and impermissible attribute values for a product configuration. Hence, when a configurable product is being configured, the configuration of that configurable product may be governed by one or more product configuration rules.

The modeling workbench 116 may be operative to communicate a defined configurable product, a product configuration rule, and/or pricing rule to the product configuration server 110. In some embodiments, the modeling workbench 116 may be operative to communicate a defined configurable product, a product configuration rule, and/or pricing rule to the enterprise systems 120. The definition of the configurable product, product configuration rule, and/or pricing rule may be communicated via the network interface 204, which may be made accessible by a service in the service layer 208. As discussed below, the procedure of communicating a defined configurable product, product configuration rule, or pricing rule to the product configuration server 110 may be considered part of a larger publishing process. During the publishing process, the product configuration server 110 may create one or more product records representing the defined object, whether the object is the configurable product, product configuration rule, or pricing rule. As a configurable product, product configuration rule, and/or pricing rule may have one or more attributes and, depending on the complexity of the defined configurable product, product configuration rule, and/or pricing rule, the attributes and attribute values for the defined may be divided into multiple records. For example, a configurable product, along with the attribute and attribute values for the configurable product, may be defined across multiple product records. However, a configurable product, or any other defined object, may be represented by a single record.

During the publishing process or on a need basis, the product definitions, attributes, attribute values and rules may be exported to an enterprise server. Further, the data may be defined across single or multiple records. This data may then be used by the enterprise server to service client devices.

In operation, the workbench 116 is a visual editor that allows a business modeler to author their product and pricing strategies. The workbench 116 is industry agnostic and is used to help model recurring problems. Recurring problems may be defined by patterns that occur in a given context. Core technological patterns may be built in the areas of search and execution. Based on these patterns, and a set of guiding forces, the workbench may recommend a solution to the recurring problems that may arise. One example of this problem-solution driven engine is the iFoundry platform, available from ValueMomentum, Inc, located in South Plainfield, N.J., United States. In this regard, the workbench 116 may be used to model different patterns of problems. A problem-solution driven engine, such as the iFoundry platform, may execute a pattern problem defined by the workbench 116. iFoundry platform continuously evolves to support new patterns of problems as supported and improved in the workbench. Thus, the workbench 116 and the problem-solution driven engine may work together to develop generic pattern driven models and solutions. The workbench 116 may be used during the modeling and administrative stages of the product lifecycle management. The enterprise servers 120 may be used during the run-time and development stages of the product lifecycle management. However, one of ordinary skill in the art would recognize that the various product lifecycle stages may be run on the workbench 116, the product configuration server 110, and the enterprise 120 individually or divided amongst them accordingly.

The workbench 116 may be used to transform models, definitions, and data to a target runtime environment. In this regard, the workbench 116 may use a transformation module in conjunction with a translator to translate the recurring patterns into possible solutions. The transformation module algorithm and rules may be written in a Domain Specific Language (DSL) targeted to business users. The server side interpreters may take the algorithm and rules and translate them to a target runtime environment. The runtime environment may implement Java. Further, the runtime rules may be implemented by a server-side rule engine, the product rules may be implemented by a server-side product engine, and the pricing rules may be implemented by a server-side pricing engine (discussed in greater detail below).

Figure 3:
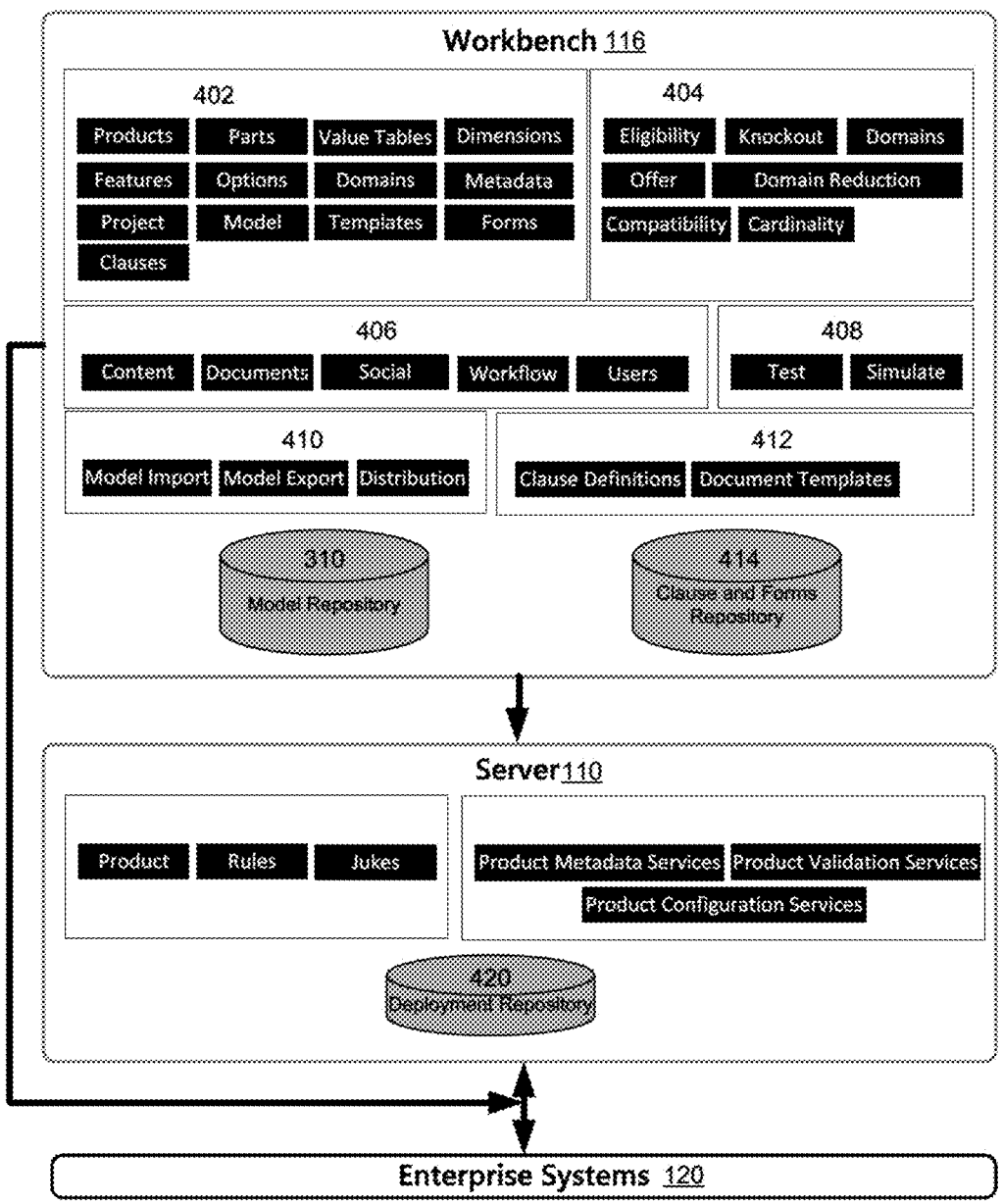
FIG. 3 illustrates an example of the interaction between the workbench, the product configuration server, and the enterprise systems.

FIG. 3 illustrates the various components of the workbench 116 and the product configuration server 110. In this regard, the workbench 116 may include a definitions module 402, a rules module 404, a collaboration and content module 406, a validation module 408, a tools and adapters module 410, a document management module 412, a model repository 310, and a clause and forms repository 414. and document management module The definitions module 402 allows a user to define products, parts, value tables, dimensions, features, options, domains, metadata, project, model, templates, clauses, and forms. As described above, products may relate to tangible or intangible objects as described above. Accordingly, an example of a tangible object may be a bicycle, while an example of an intangible object may be an insurance policy. One of ordinary skill in the art would recognize that these are merely examples, and that the definitions module described herein may be used to configure any type of product. Generally, products, as used herein, represent the marketable or sellable aspects of the offering.

Parts may relate to various components that go into the product. For example, if the product is an insurance policy, the parts may be the types of coverage (i.e., car insurance, home insurance, umbrella policies) that go into a product. Alternatively, if the product is a bicycle, the parts may describe the tires available to be included on the bicycle.

Features may provide additional details related to the parts. That is, the features module may further define the parts. For the insurance policy example, the definitions module 402 may define a limit or limits available for the various types of coverage. In this regard, the features module may indicate that the type of coverage has a set of limits associated therewith. For instance, a car insurance feature may have limits, such as bodily injury limit and collision coverage. In this regard, the features define such limits and are managed using the workbench and dashboard described in greater detail below. Alternatively, the tire feature described above may be defined by tire sizes.

Most features may have one or more possible options for a user to select for the desired product. These are known as options and allow a user to select one or more additional options to further define the feature. For example, a collision coverage feature may have limit values of $50,000; $100,000; or $250,000 as possible options. Alternatively, the tire feature may have different sizes, such as 16 or 22 inches, as possible options for the tire feature defined above.

Domains help to hierarchically organize the management of product and pricing strategy. In this regard, products may be organized in a number of ways. For example, insurance policies may be organized according to nationwide and statewide availability. Alternatively, the channel of commerce may be another example of domain.

The value tables may be intelligent lookup tables such that data is search using the Jukes search algorithm. Using the value tables, searchable lookup data may be organized by multiple fields, such as date. These fields may be defined as Jukes fields. After defining the Jukes fields, a Jukes engine may organize the searchable fields using a search algorithm, which provides an efficient approach to retrieving lookup data. In this regard, the Jukes algorithm is very effective at selecting the most suitable value for a transaction context from several possible outcomes.

Dimensions may be optional parameters that enable more localized variations of a product option. That is, dimensions may provide finer granularity to the options described above. In this regard, dimensions apply to the specific product part and not the larger product plan. For instance, the limits available for certain coverages, as described above, may be further limited based on territory of type of business.

Additionally one or more of the product parts or features may need additional disclosure when offering a product for sale in order to comply with state and federal laws regarding disclosure. These additional disclosures may be managed using forms. In this regard, a product manager may define various forms that can be included with or attached to a product, part, feature, or option. Forms may have different versions as well, which are managed by users using Jukes.

Clauses may be stored documents which may include terms, stipulations, provisos, etc., which may be selectively integrated into a product. In this regard, clauses may be selectable, pre-defined terms stored in a document, which outline the boundaries of a product. For example, a clause may include the definitions of covered property in a homeowner's insurance policy. In another embodiment a clause may detail how a deductible is calculated. Clauses may be used to assemble documents which are manifested as forms. Clauses along with document templates and product definitions may also be used to assemble forms which are tied to a product. In this regard, documents may be assembled and generated based on the product definitions. Different versions and variations of clauses may be supported based on domains and dimensions as explained throughout. For example, jukes may be used to manage versions and variations. Clauses are discussed in greater detail below with respect to FIGS. 30-34.

Finally, projects may be a logical container of a model within the modeling repository. That is, a project may include the product, parts, features, and/or options described above. In this way, projects may help organize product plans for a business. The interrelationship and defining of the product, parts, features, and/or options is discussed in greater detail below with respect to FIGS. 7 and 8.

The rules module 404 may define the configuration rules described above. While product definitions may represent the basic structure of the product (which includes parts, features, options, etc.), rules may control the behavior of the product. In this regard, rules may help address how a product should manifest for problems or scenarios which cannot be directly represented by the definitions. That is, while domain and dimensional aspects of a product may help represent product variations based on jurisdictions and other user behavioral characteristics, rules may handle exceptions that may not be contemplated by the definitions. Rules may also have different versions which may be managed by Jukes to address the dimensional variations of the rules. Different products may be defined by different rules. These rules may be defined by the provider of the configurable product or defined by federal or state law. Accordingly, the rules module 404 may organize and verify that products adhere to the defined rules. For example, a product defined by the definitions module 402 may be checked by the rules module 404 to ensure that it complies with the defined rules. For instance, an insurance product may be checked by the rules module 404 to ensure that it meets the minimum coverage requirements defined by state law. If not, the rules module 404 may alert the modeler that the product does not comply with rules.

Additionally, the rules module 404 may ensure that any features included in the product are up to date. In this regard, the rules module 404 helps to manage the domains and ensures that out-of-date features are not included in the product. Product rules may include different types of rules to address specific business needs. For example, domain reduction rules, cardinality rules, compatibility rules, validity rules, eligibility rules, knockout rules and offer rules may be tailored to meet specific business needs. Examples of rules are further described in U.S. Pat. No. 8,290,822 filed on Aug. 20, 2010 and entitled "Product Configuration Server for Efficiently Displaying Selectable Attribute Values for Configurable Products" which is commonly assigned with the present application and hereby incorporated in its entirety by reference.

The collaboration and content module 406 may allow a modeler to collaborate with other users of the workbench 116. That is, modelers may collaborate via email, instant messaging (IM), or any known communication technique to collaborate on initiatives/products. Additionally, workspaces and the dashboards (discussed in greater detail below) may also be used as collaboration tools. The collaboration may be performed through digital devices which are known in the art, such as through smartphones, tablets, PCs etc. Further, collaboration may be performed through web-interfaces such as online collaboration websites.

The validation module 408 may allow a modeler to test and simulate any products developed. That is, the validation module 408 may compile the product configured by the modeler and run it through various scenarios to ensure that the product will not fail when provided to the enterprise systems 120.

The tools and adapters module 410 may manage the models that have been developed by the modelers using the workbench 116. In this regard, the tools and adapters module 410 may be configured to import product models from other providers. For example, insurance bureau content providers may provide product modules. Additionally, core administration systems deployed within an enterprise may also be an example of a provider. Similarly the tools and adapters module 410 may be configured to export and distribute the product models to either other systems or to the enterprise systems 120.

The document management module 412 may manage clause definitions and document templates that have been developed by modelers. In this regard, the document management module 412 may be configured to define, organize, export, and distribute clause definitions and document templates. Furthermore, the document management module 412 may organize into clause definitions into collections based on defined parameters, such as, for example, the clause definitions purpose, the clause categorization, and the product definition. The document management module may also be configured to define, organize, export, store, and distribute dynamic document templates which capture configurable product features, parts and potential relations between one or more configurable products. Accordingly, the document management module 412 may allow a modeler to select a document template and associate certain clause definitions with the document template. The document clause, templates and generated documents are maintained in document management system. System will have ability to search documents in the document management system.

The model repository 310 stores product models developed by modelers using the workbench 116. Furthermore, the model repository 310 may store product models received from the product configuration server 110 or the enterprise systems 120. In this regard, the model repository 310 may include a searchable database to manage the product models generated by the modelers using the workbench 116.

The clause and forms repository 414 stores clauses and forms developed by modelers using the workbench 116. Furthermore, the clause and forms repository 414 may store forms and clauses received from the product configuration server 110 or the enterprise systems 120. Forms repository also stores forms templates and clauses and generated forms independent of the product configuration server 110 and enterprise systems 120. In this regard, the clause and forms repository 414 may include a searchable database to manage clauses and forms generated by the modelers using the workbench 116. Document management systems 412 can be $3^{rd}$ party document management systems. Workbench 116 may have modules to support different $3^{rd}$ party document management systems.

The product configuration server 110 may include a plurality of engines 416, including a product engine, a rules engine, a rating or pricing engine, a jukes engine. The product configuration server 110 may also include a plurality of services 418, including a product metadata services, a product validation service, a product configuration service. The product configuration server 110, may further include a deployment repository 420.

The product engine may manage the various products that are offered by the product configuration server 110. In this regard, the product engine may contain a searching function that allows either the workbench 116 or the enterprise system 120 to search the deployment repository for the available products.

Additionally, the product engine may allow the enterprise system 120 to configure a product in accordance with the parts and features defined by the modeler. That is, a modeler may build a model product and export the product to the product configuration server 110. Once the model product is available on the product configuration server 110, the enterprise system 120 may use the product engine to configure a product for an end-user. The product engine may load and execute all of the product definitions and rules defined by a modeler using the workbench. The modeled product definitions and rules may be published to the product engine using a publishing process. In a different manifestation, product definitions may be made available to an enterprise system 120 to execute without the product configuration server 110.

The rules engine is similar to the rules module 404 in that it may verify that features included in a product are up to date and that the features do not conflict with any rules set by the product provider. In this regard, the rules engine may verify that any product configured by the enterprise systems 120 adheres to the rules set forth the product provider. Additionally, the rules engine may implement the rules defined by the end user such that the product complies with preferences, policies, and state and federal laws.

The jukes engine may retrieve the various features that go into configuring a product. That is, the jukes engine accesses the available features and parts to be incorporated in a product. Accordingly, the jukes engine serves as a matching tool to resolve the right version of an entity that is searched. Jukes is an algorithm which organizes searchable indexes using weights and precedence. Once jukes indexes are defined, data may be organized based on the Jukes indexes. In operation, the jukes algorithm may load and organize jukes indexes to resolve conflicts and return the most suitable response to a search request. Jukes have proven to be particularly efficient in scenarios where more than one possible outcomes may be possible for a search. In this regard, jukes may select the most suitable outcome from the more than one possible outcome for a search. In this regard, Jukes may be used effectively to organize different versions of product definitions, which include products, parts, features, options, rules, value table, etc. Moreover, jukes capabilities are not limited to the listed product definitions described above. In some embodiments, the jukes algorithm may derive resolve conflicts between multiple versions of content to retrieve the most suitable version.

Figure 30:
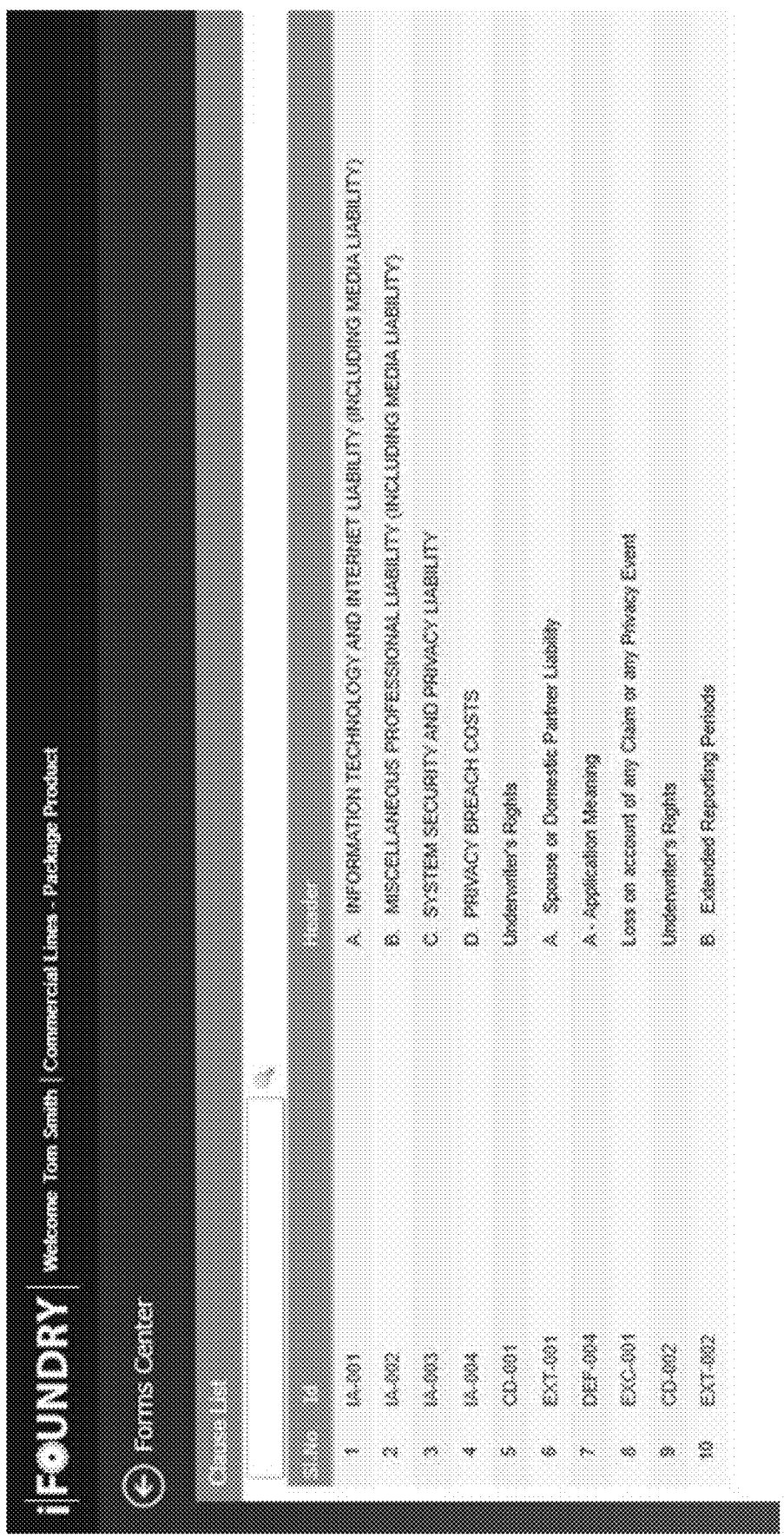
FIGS. 30-34 show various examples of a graphical user interface for searching and configuring one or more clauses.
Figure 31:
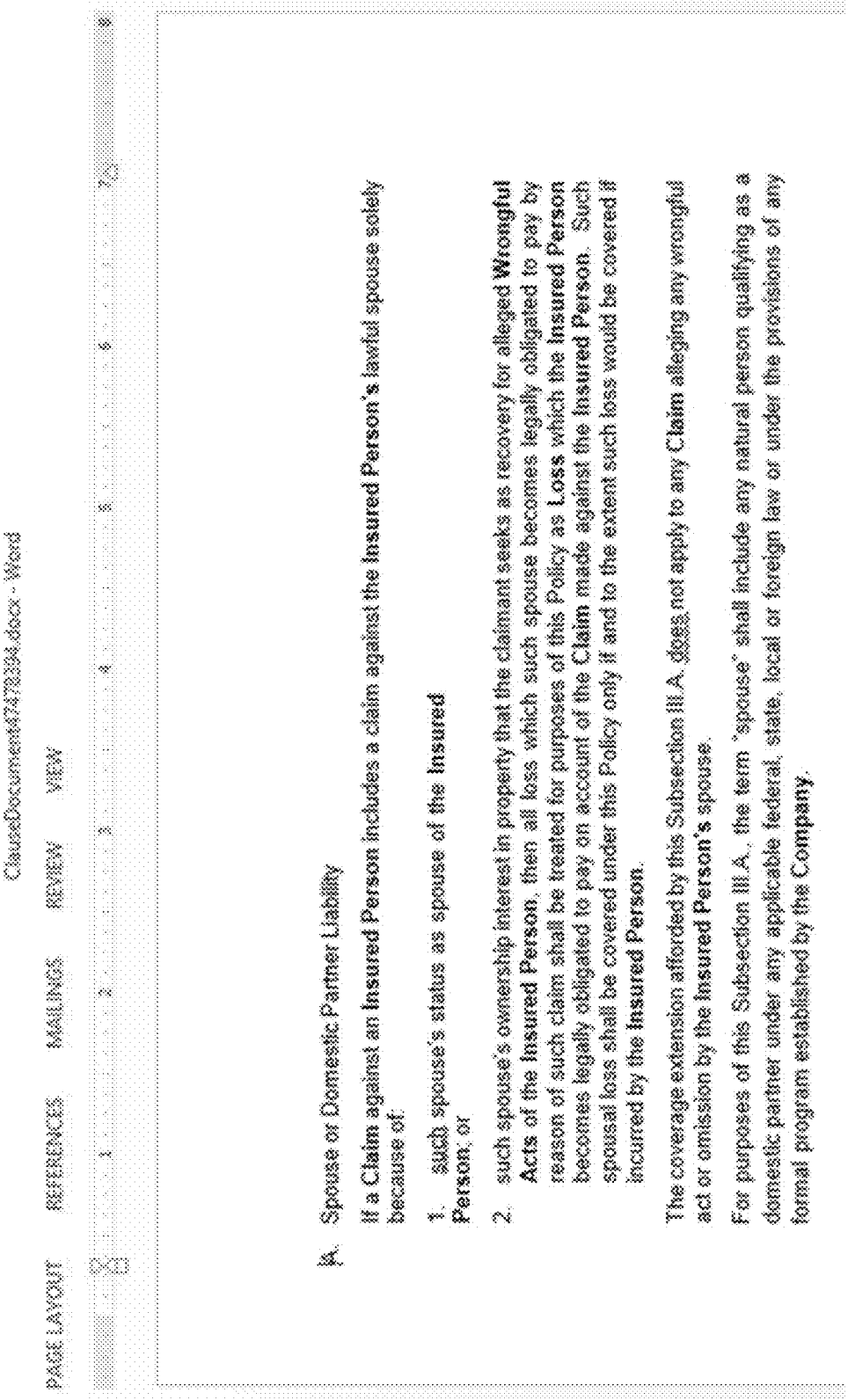
Figure 32:
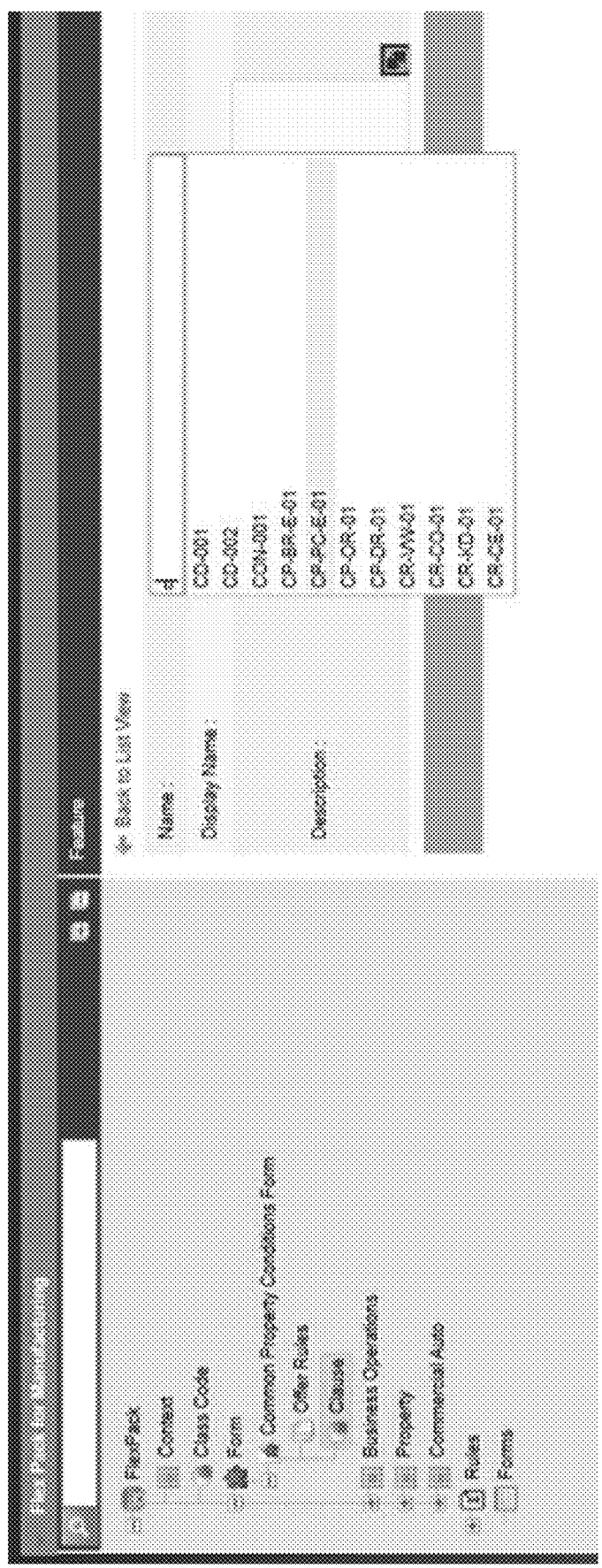

Referring to FIGS. 30 and 31, screenshots of creating, editing, and searching for clauses are shown. Turning to FIG. 32, the "Clause List" may include a list of all of the clauses currently stored in the clause and forms repository 414. In this regard, the clauses in the "Clause List" may be organized by "Header" information or "ID" information. The clauses in the "Clause List" may also be selectable to a modeler of the workbench 116. For example, a modeler may select clause "EXT-001," which includes "A. Spouse or Domestic Partner Liability" clause. Organization of clause list may configurable and not limited to a header and/or ID.

Accordingly, the ability to search a clause may also vary based on metadata associated with the clause.

Upon selection of a clause in the "Clause List," the modeler may be taking to a clause definition screen, as shown in FIG. 3I. The clause definition screen may allow a user to edit, delete, or add clauses to a selected clause. As shown in FIG. 3, the clause definition screen may include an interactive word processor, such as Microsoft Word® or Word Perfect®, to enable a modeler to manipulate the selected clause. Additionally, a modeler may create a new clause in the clause definitions screen. Continuing the above example, when the modeler selects clause "EXT-001," the user may be taken to a word processor which allows the modeler to edit the "A. Spouse or Domestic Partner Liability" clause. Selection and association of clauses and forms to products may also be governed by rules which are in turn restricted based on domain and dimensional variations.

The product configuration service allows a user of the enterprise systems 120 to configure the products available on the product configuration server 110. That is, the product configuration service interacts with the product engine and jukes engine to configure products for the enterprise systems 120.

The product validation services may validate the product configured by the enterprise systems 120. In this regard, the product validation services may communicate with the rules engine and look at product definitions to verify that the product configured by the enterprise systems 120 complies with rules defined by the product provider and any applicable laws. The validation services may leverage jukes to resolve to right product configuration ensuring regulatory and actuary compliance.

The product metadata services may use metadata for search and retrieval during a product configuration phase. That is, the product metadata services may work with the jukes engine to retrieve at least one element of data content or at least one element identifier that describes the type of content of the at least one element of data content. Product metadata may be used by the enterprise system 120 to develop products that are dynamic in nature. For instance, the product metadata services may be used to present product options and features to a user via an intuitive transaction application. Additionally, the product metadata may also be used to exchange product definitions and guidelines with external systems.

The deployment repository may store products that have been configured by the enterprise systems 120. In this regard, the server repository can help organize various product plans offered by the product configuration server 110. Accordingly, various product plans can vary across domains and versions. The components inside the product plans can be varied by dimensions.

The enterprise system 120 may include an interface or portal that allows client devices to configure and otherwise tailor products to their needs. The interface or portal may include a full feature core administration system which allows client devices to fully customize their product needs.

Figure 4:
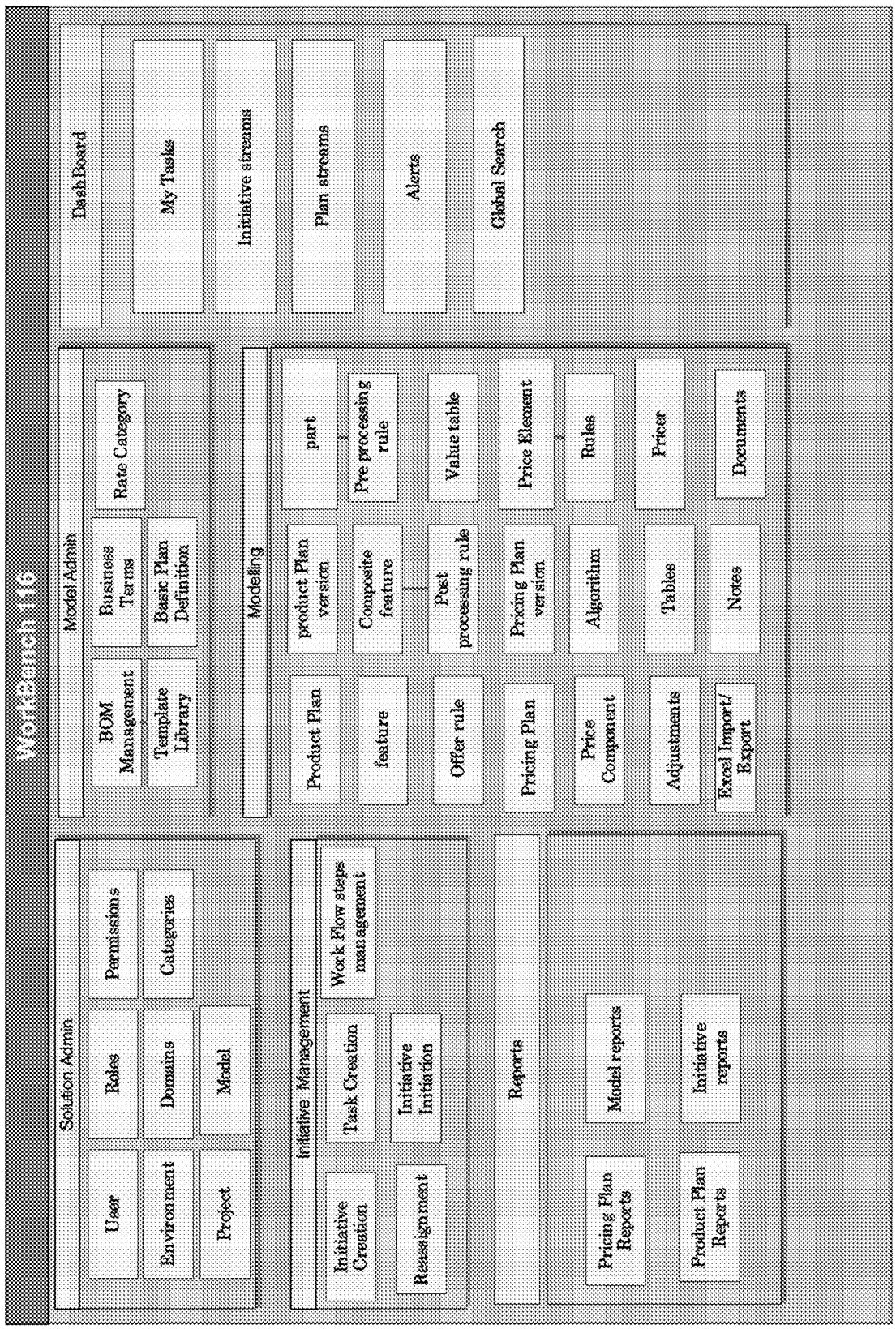
FIG. 4 illustrates an example of the workbench modules.

Turning to FIG. 4, another representation of the workbench 116 is shown. In this regard, the workbench 116 may include an administrative solution module, an initiative management module, a reports module, a model administrative module, a modeling module, and a dashboard.

The administrative solution module may manage the users that access the workbench 116. In this regard, the administrative solution module may include features to define and manage user access. That is, the administrative solution module may define rules and permissions for the various users of the workbench 116.

The initiative management module may manage the implementations and changes associated with product model implementations and changes. The initiative management module may define tasks and deadlines for the users of the workbench 116. Additionally, the initiative management module may assign user authorities. That is, the initiative management module may indicate the user or groups that will review a modelers work. The initiative management module may also allow administrators and managers to define a structured or unstructured process to organize and deliver a product change as per the user's plan and commitments. The initiative management module may also allow collaboration between different users in complete a planned model change.

The reports module may manage the pricing plan reports, the model reports, the initiative reports, the product plan reports, etc. One of ordinary skill in the art would recognize that the systems described herein may generate additional reports, such as work management, work status, etc. As such, one of ordinary skill in the art would recognize the possible reports that were capable of being generated from the examples described herein. The reports module may also generate reports for administrators or managers to keep track of product plan workflows. In this regard, the pricing and product plans may be managed and organized accordingly to remain consistent.

The model administrative module may keep track of the business object management. The model administrative module may include a template library for developing a product plan and its variants. Further, the model administrative module may maintain a basic definition plan. Moreover, the model administrative module may manage a product plan and its associated variants. The model administrative module may address the foundational building blocks necessary to create and define a model. For instance, Business Object Model, Business Terms, Business Plan Definitions, etc. may represent some of the foundational aspects that may make up the core of a product, pricing, or rule definition. The model administrative module may help businesses define these core aspects, which in turn will drive future modeling efforts. In this regard, the modeler may not initiate modeling activity until the core structural aspects of the model are defined using the model administration module.

The modeling module may provide a modeler with the ability to model a product or maintain a modeled product. In this regard, a product plan may contain many variants and versions. Each variant or version may be provided to a different modeler to configure. In this regard, many of the features of the product plan and its variants and variations may be configured using the modeling module. The modeler may use the modeling module to define plans, products, features, clauses, forms, and options for a product that the modeler may want to offer in the marketplace. Additionally, the modeler may use the modeling module to define rules. In this regard, the modeling activities are supported using initiatives and other supporting lifecycle capabilities.

The modeling module may include pre-processing rules, offer rules, and post-processing rules. Pre-processing rules happen before the actual product and options are configured. For instance, a rule classifying the products that may be offered to a customer may be defined. An example may be to define a rule that classifies a customer as "Gold" or "Silver" based on their credit score. Once a customer has been classified as "Gold" or "Silver," the product options and features presented to the customer may be changed based on the customer classification. Additionally, deriving aggregations and values may be an example of a pre-processing rule. In this regard, any rule that may be processed prior to execution of the actual product definitions and rules may qualify as a pre-processing rule.

Offer rules may relate to the actual configuration constraints on the product model. In this regard, offer rules may be written for compatibility between the products offered in a product plan. Alternatively, the offer rules may validate the product parts and the domain reduction types. An example of an offer rule may be a compatibility rule, which may indicate that collision coverage may not be provided for vintage vehicles. An alternative example may be a validity rule, which indicates that a fire station must be within three miles of a commercial property in order for the commercial property to get comprehensive coverage. The system may support a variety of offer rules depending on the product type, business model, industry, etc. In this regard, the system may classify offer rules to help business users organize and manage rules.

The post-processing rules may be implemented after the product plan and its variants have been configured. In this regard, some post-processing rules may reset values after the product plan has been developed to comply with rules set forth by the provider, the modeler or the state or federal laws. For example, a post-processing rule may offer a discount and provide a change in the product option to offer competitive product and pricing options to the user. Additionally, these offers may modify the final product and price offered to the customer. In this regard, the primary focus of post-processing rules is to support adjustments without changing any of the core product definitions and rules. State and federal laws may influence these rule definitions. The influence of state and federal laws may be universal to the developing the product plans discussed herein and should not be construed as being limited to the pre- and post-processing rules discussed above.

The dashboard provides a graphical user interface (GUI) for a modeler to interact with the workbench 116. The dashboard may include an itemized list so a user of the workbench 116 can keep track of the initiatives assigned to the user. Additionally, the initiatives (e.g. product plan variants) may be displayed in an initiative stream for the users review. Alerts may also be visually displayed for the user to provide notification of the status of initiatives under review, any changes to product plans, etc. Furthermore, the dashboard may include a searching function that allows the user to search for various features related to the product plan. Further details of the dashboard will be discussed below with respect to FIGS. 11-26.

Figure 5:
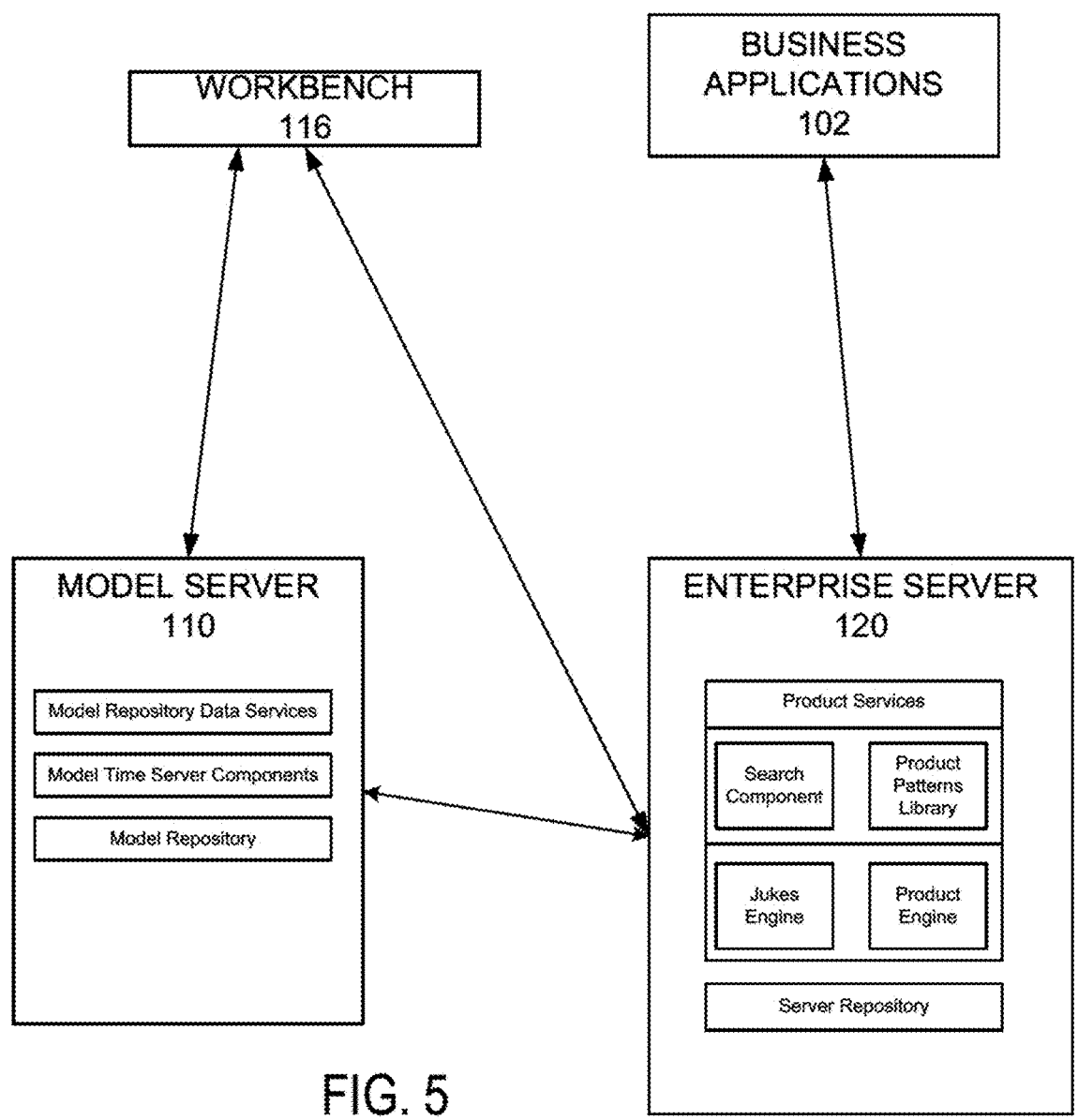
FIG. 5 illustrates an overview of a product configuration system according to another example described herein.

Referring to FIG. 5, an example of the interaction between the workbench 116, the model server 110, the enterprise server 120 and the business applications located on the client device 102. In operation, a modeler, such as an employee of an insurance carrier (e.g. actuary), accesses the workbench 116 to create or change a product plan. From the workbench 116, the modeler may access the model server 110. In this regard, model server may be compared to the product configuration server discussed above. In accessing the model server 110, the modeler may define the product plan and its features, parts, options, etc. using the model repository data services and the model time components. After the user has modeled the product plan or variant, the product is stored in the model repository to be subsequently published to the enterprise server 120.

On the enterprise server 120, the published product plan has now entered a run-time environment. That is, a business application operating on the client device 102 may be able to access a product plan or variant thereof and configure it to their needs and preferences. Accordingly, the enterprise server 120 may use the product services and server repository stored locally to configure a product tailored to the business application's needs and preferences. The enterprise server 120 may execute all product definitions without having to call the product configuration server 110.

Figure 6:
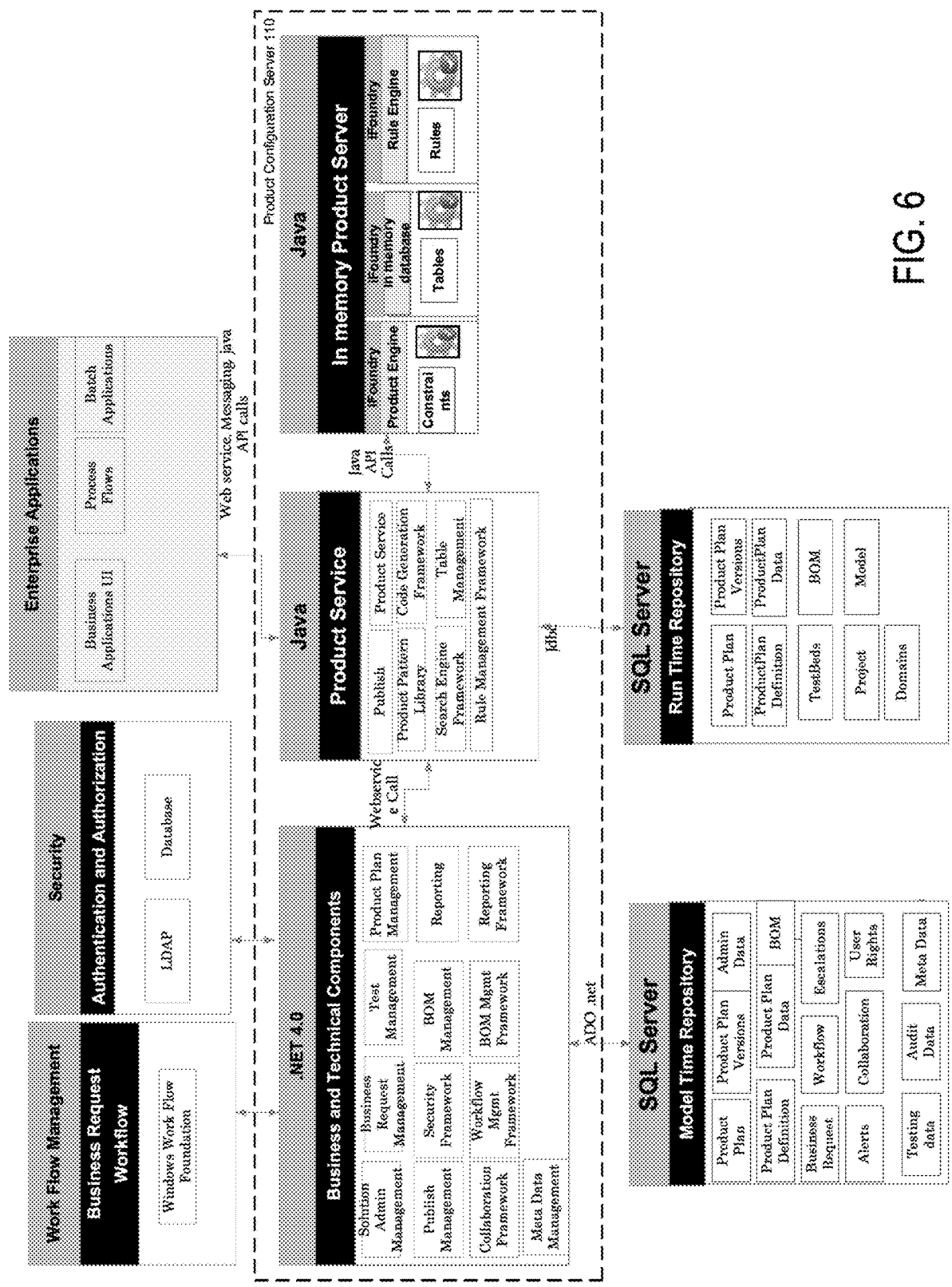
FIG. 6 illustrates an overview of the product configuration server and its deployment environments.

Turning to FIG. 6, an operational view of the product configuration server 110 is shown. In this regard, the product configuration server 110 may communicate with a workflow management module, a security module, enterprise applications, and at least one SQL server. FIG. 6 shows that the product configuration server 110 the workflow management module, the security module, the enterprise applications, and the at least one SQL server may operate on their computing platform. However, one of ordinary skill in the art would recognize that any combination of the features shown in FIG. 6 may be operated on a single server. Alternatively, any combination of features displayed in FIG. 6 may be implemented on the same computing platform.

The product repository may be managed in relational database management system, or any known database management system, using XML models or similar meta-model based representations. A model time repository, such as repository 310 in FIG. 3, may be supported by repository services and components which are used by the workbench environment. This separates workbench user experiences from underlying repository access. This design may also enable an easy way for updating the workbench to accommodate changes in user interface technology. The repository services may also provide an interface for tablets, mobile devices, and other portable devices to provide better and more flexible modeling experiences. In this regard, the solution environment may be built to scale to multiple modeling environments at the same time. In some implementations, a modeler may start modeling a product plan on one platform (i.e., tablet device) and complete the modeling activity on a different device (i.e., a mobile phone, tablet device, or laptop computer). Seamlessly transitioning between different modeling platforms may be achieved by leveraging the modeling repository and repository services. A similar design approach may also be implemented with respect to the runtime repository located on the enterprise systems 120.

According to FIG. 6, the product configuration server 110 includes business and technical components module, a product service module, and iFoundry engines stored in a memory of the product server.

The business and technical components module may communicate with a workflow management module, for example the workflow management module located on the workbench 116. In this regard, the business and technical components module and the workflow management module may collaborate to manage the implementation or modification of various product plans. Additionally, the business and technical components module may also communicate with a SQL server that operates a model time repository. In this regard, the SQL server may model the product plans being developed by a user of the workbench 116. Thus, the business and technical components module may communicate with the SQL server to track the workflow of the product plan initiatives being implemented. Finally, the business and technical components module may communicate with a security module to manage the workbench users' access to the product configuration server 110.

The product service module may communicate with the business and technical components module, the enterprise applications discussed above with respect to FIG. 5, a SQL server with a run-time repository, and the iFoundry engines. In this regard, the produce service module may publish the product plans after being developed by the workbench user. In this regard, the product service module may communicate with the SQL server to ensure that the product plan is implemented properly. Moreover, the product plan communicates with the business and technical components module to further configure the product plan when accessed by the enterprise applications.

Figure 7:
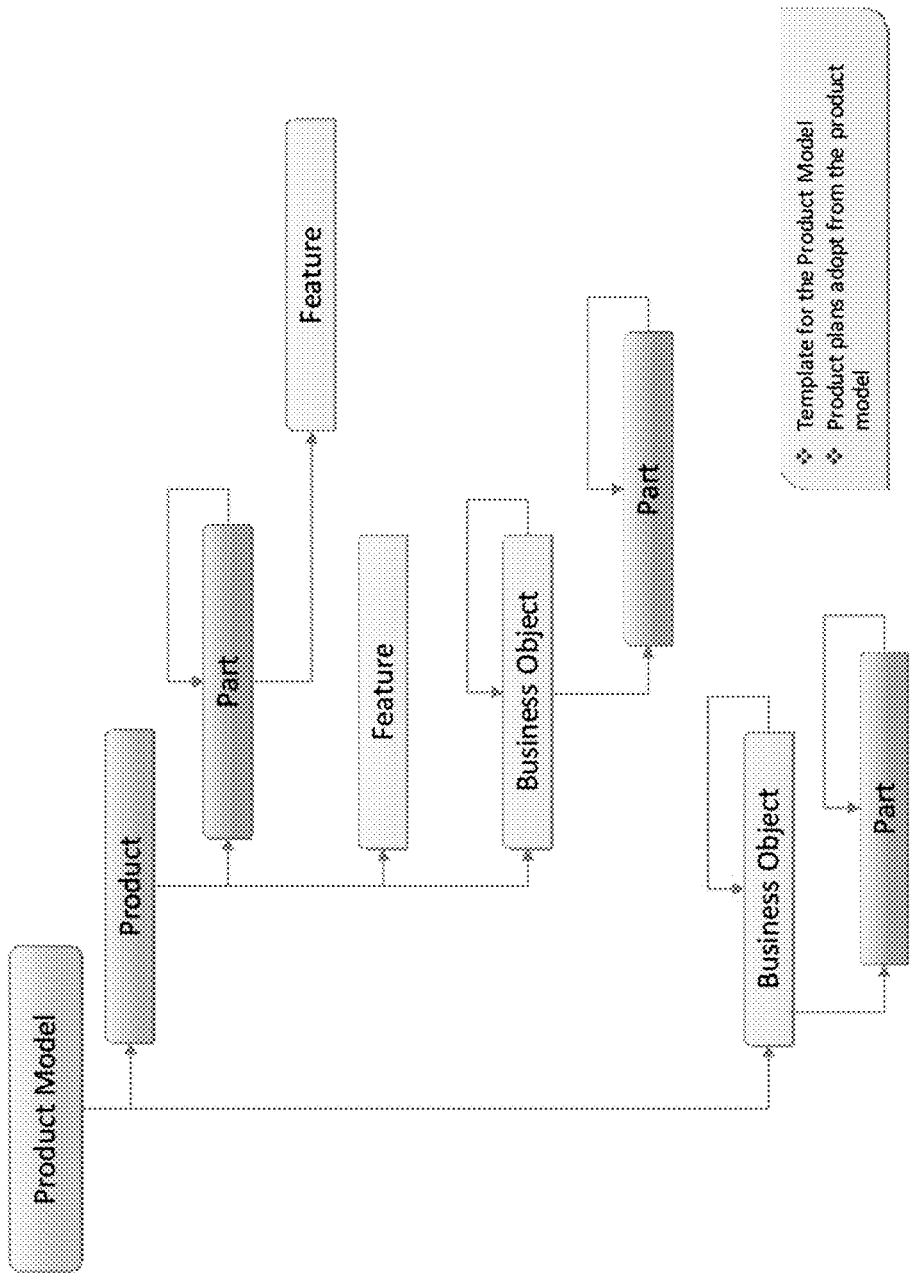
FIG. 7 illustrates a hierarchy of defining the parts and features of a product.

Turning to FIG. 7, an overview of configuring a product model is shown. The terms employed in FIG. 7 may be defined below by Table 1.

Figure 16:
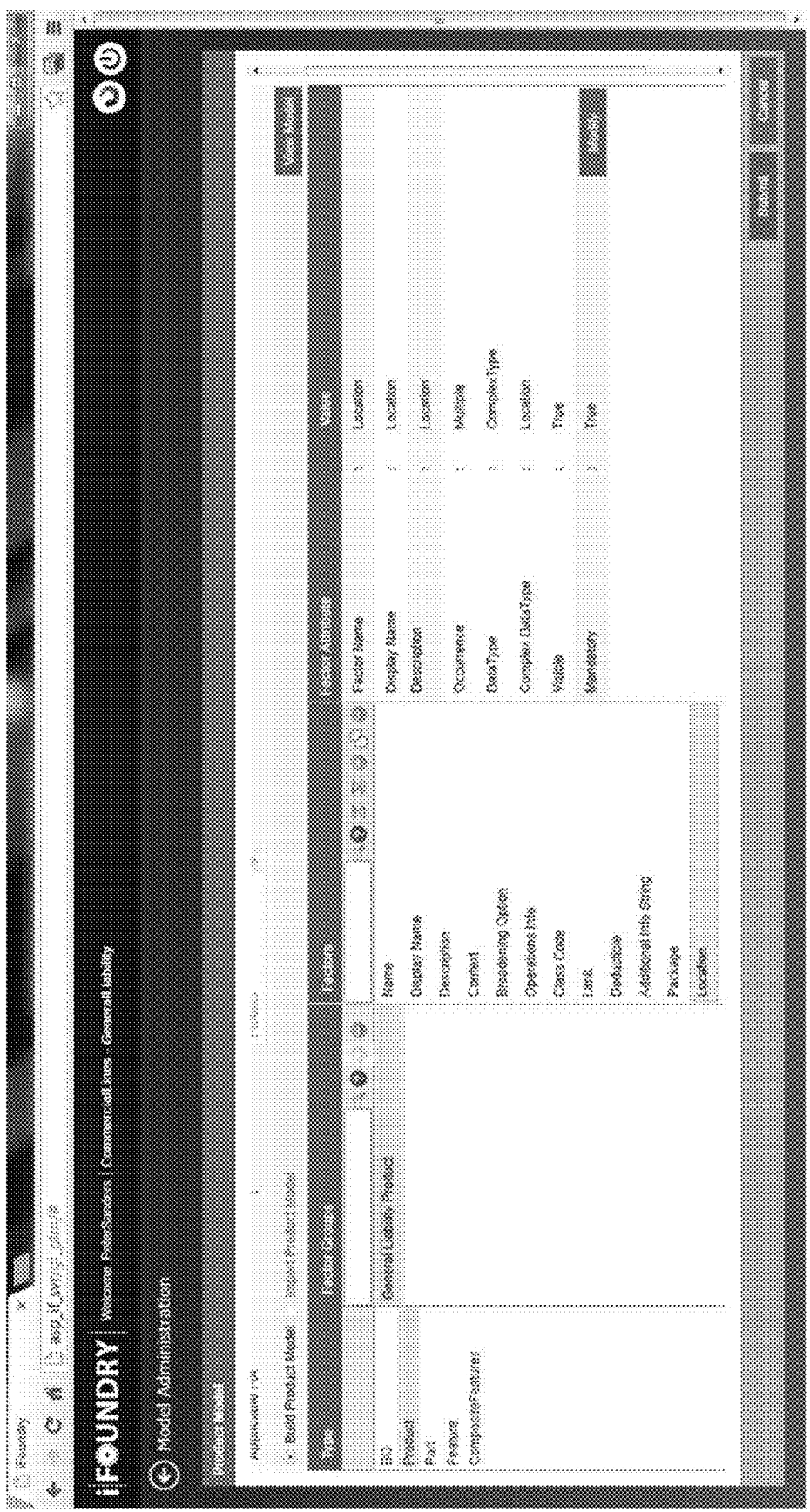

FIG. 16, discussed in greater detail below, represents an example of a Business Object Model administration environment.

Accordingly, an administrator creates a project to build a model for a line of business. For example, an insurance company may have one project for commercial lines of business and a different project for personal lines business. Each project has its own model which defines the foundation structure of the product, which has a business object model as one of its elements. However, one of ordinary skill in the art would recognize that any product, tangible or intangible, may be used in place of the insurance examples described herein.

In one of the business object model implementations, an administrator may define the structure of the product model. In this regard, the product model may be a structural definition (plan), that includes the parts, features, and coverages. Accordingly, a modeler, who may be the administrator or another party, will define the parts, features, and coverages within the plan. In alternative embodiments, a product model may also be at an instance level. That is, the parts, features, options, etc., may be defined in the business object model by an administrator. Administrators may proceed according to any one of the examples described above depending on the need of the model development.

The modeler begins by defining the parts of the product. As indicated above, the parts may include various components that go into forming the product as a whole. In this regard, FIG. 7 illustrates a loopback to indicate that any number of parts may be included in the product. Addition-

TABLE 1

| SNO | Pattern | Relationship | Pattern |
|---|---|---|---|
| 1 | Project | Contains | Model |
| 2 | Model | Contains | Plans |
| 3 | Plan | Contains | Plan Versions |
| 4 | Plan Versions | Organized By | Domains |
| 5 | Product Plan | Type Of | Plan |
| 6 | Pricing Plan | Type Of | Plan |
| 7 | Product Plan | Contains | Parts |
| 8 | Parts | Contains | Feature |
| 9 | Feature | Contains | Feature Options |
| 10 | Feature Options | Can be varied by | Dimensions |
| 11 | Parts | Contains | Composite Feature |
| 12 | CompositeFeature | Contains | Multiple Features |
| 13 | Offer Rules | Written in the scope of | Part |
| 14 | Preprocessing Rules | Written in the scope of | Product |
| 15 | Post Processing Rules | Written in the Scope Of | Product |
| 16 | Pricing Plan Version | contains | Price Element |
| 17 | Pricing Plan Version | contains | LookupTables |
| 18 | Pricing Plan Version | contains | Formula |
| 19 | Pricing Plan Version | contains | Pricer |
| 20 | PriceElement | contains | PriceComponents |
| 21 | PriceComponent | contains | Rates, Deviations |
| 22 | Price Component Data | Can be varied by | Dimensions |
| 23 | Eligibility, Knockout Rules | Can be written in the scope of | Price Element |
| 24 | PE | contains | Adjustments |
| 25 | Adjustments | Can be varied by | dimensions |
| 26 | Formula | Can be varied by | dimensions |
| 27 | Pricer | Can be varied by | dimensions |
| 28 | Cap and Floor | Can be set for | PE/PC |
| 29 | Plan | Can have | One master pricer(to do multi variation pricing) |
| 30 | PricingPlanVariation components | Can refer to | Other pricing plan variation components |
| 31 | ProductPlanVariation components | Can refer to | Other product plan variation components |
| 32 | PricingPlanVariation components | Can refer to | Pricing Library |
| 33 | ProductPlanVariation components | Can refer to | Parts Library |

Foundationally, an administrator defines a business object model for a product line based on the meta-model represented in FIG. 7. For example, an administrator defines a business object model for a personal auto insurance product. This business object model provides the guidelines and structure for building product parts, features, and options. Additionally, the business object model may support the ability to build rules to drive product offerings. FIG. 7 represents the foundation model which controls the structure of the Business Object Model. Every customer and every line of business may have different structures based on their needs. For example, a personal auto insurance product may have different structures for different insurance companies.

ally, FIG. 7 shows that various features may be specified with respect to the feature. Once the parts have been defined, the product may define features that are applicable to the product plan. Finally, the product plan may define a business object. As illustrated in FIG. 7, the business object may include at least one part. In this regard, a product plan model (i.e. template) is developed.

For example, a modeler may be assigned to develop an insurance policy. According to this example, the product is an auto insurance policy. Next, the modeler may add parts to the auto insurance policy. For instance, the modeler may define bodily injury coverage and collision coverage as possible parts to the car insurance policy. The modeler may then be prompted to enter certain features, such as limits available to purchasers of this policy, related to the coverage part of the insurance policy. Additionally, the modeler may add another part, such as property damage coverage for the auto insurance policy. Again, the modeler may be prompted to specify features, such as rate limits or deductibles, related to the property damage coverage. Finally, the modeler may be prompted to include business objects in the insurance policy. The ability to add parts to a product and features to a part, etc., are controlled by the definition of the business object model created by the administrator for lines of a business model.

Figure 8:
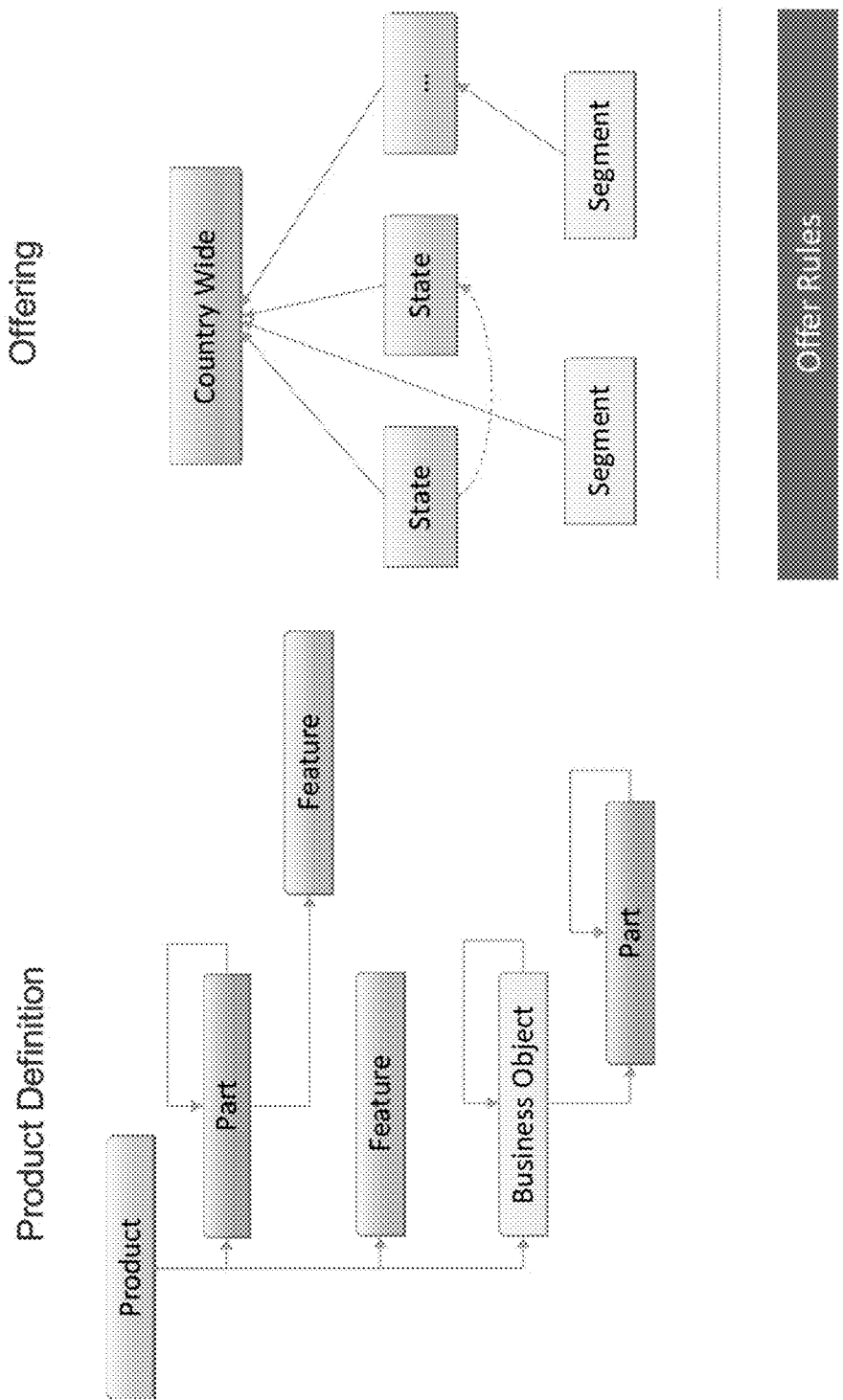
FIG. 8 illustrates a product definition and an offering of the product definition.

One aspect of the product definition illustrated in FIGS. 7 and 8 is the ability to refer to other product definitions. For example, a modeler may define a nationwide insurance policy that includes certain parts and features. For instance, the nationwide insurance policy may include a life insurance part with a $500,000 limit as a feature. Accordingly, a variant of the nationwide insurance policy may be a state insurance policy. Instead of defining the life insurance part again, the state insurance policy may refer to the life insurance part of the nationwide insurance product. Further, a portion/segment of the nationwise/countrywide or state life insurance policy may also be possible. However, this creates an issue if the nationwide life insurance part is ever updated.

In this regard, the current invention may provide an update to a user when a referenced part is updated. That is, if the nationwide/countrywide life insurance part is updated, an alert may be generated any time the state or segment insurance policy that refers to the nationwide/countrywide life insurance part is accessed. The modeler may be presented with several options. For example, the modeler may choose to update the state insurance policy with the updated information from the nationwide life insurance part. In case the modeler chooses to use the nationwide information for the state insurance policy, the modeler can continue to refer to the nationwide change. Alternatively, the modeler may be presented with an option to keep the old language and refer to an earlier version of the nationwide life insurance part. Yet another option may be to allow the modeler to refer to a different product variant. That is, the state insurance policy may refer to a second state's life insurance part. Yet another option may be for the modeler to redefine the state part with its own options different from the nationwide part. Modelers may change options to refer or redefine product parts, features, options, etc. at any time.

While defining a plan to introduce a change to a product model, a modeler may have several options. First, the modeler may create a new instance of a part, feature etc. Alternatively, the modeler may refer to a part or feature in another plan which is at a higher level in the plan hierarchy. Similarly, the modeler may refer to a part or feature at the same level in the hierarchy or refer to a part library which maintains reusable sets of parts, features, and options built in different plans across the system. Accordingly, the system enables modelers to publish various product parts, features, and options as part of a library so that the parts, features, and options may be reused across different plans and user groups more efficiently.

Figure 9:
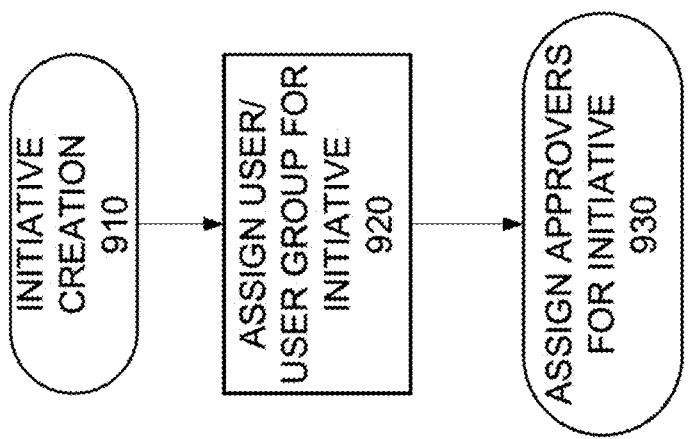
FIG. 9 illustrates a flowchart of the method of creating an initiative.

FIG. 9 shows a flowchart of the workflow with regards to assigning an initiative/product plan. In this regard, the workflow begins with the initiative creation in block 910. The initiative creation may be to develop a product plan, such as an insurance policy. Alternatively the initiative creation may include generating a business request or an intangible or tangible product as described above. One of ordinary skill in the art would recognize the other alternatives from the examples described herein.

After the initiative is created in block 910, the initiative is assigned to a user or a group of users in block 920. In this regard, an administrator may assign an individual to develop the initiative/product plan. For example, an actuary that works for an insurance carrier may be assigned to develop a nationwide insurance policy. Alternatively, an administrator may assign a group of users to handle the initiative/product plan. According to this example, the initiative may be to develop a nationwide insurance policy and state variants of the nationwide insurance policy. Developing an insurance policy and its variants would be better handled by a group of actuaries working. In another example, the initiative/product plan may be assigned based on a scheduling algorithm, such as round robin, or a load balancing algorithm.

Finally, a group of reviewers/approvers are assigned in block 930. As described above, an administrator may assign the reviewers/approvers to review the initiative/product plan. In the alternative, the reviewers/approvers could be assigned based on a scheduling algorithm or a load balancing algorithm. In other examples, the reviewers/approvers may be he individuals or groups manager or supervisor.

The user grouping, assignments, and reassignments may be based on a user's specialization or preferences. The underlying workflow system enables an efficient way of handling workflow management.

Figure 10:
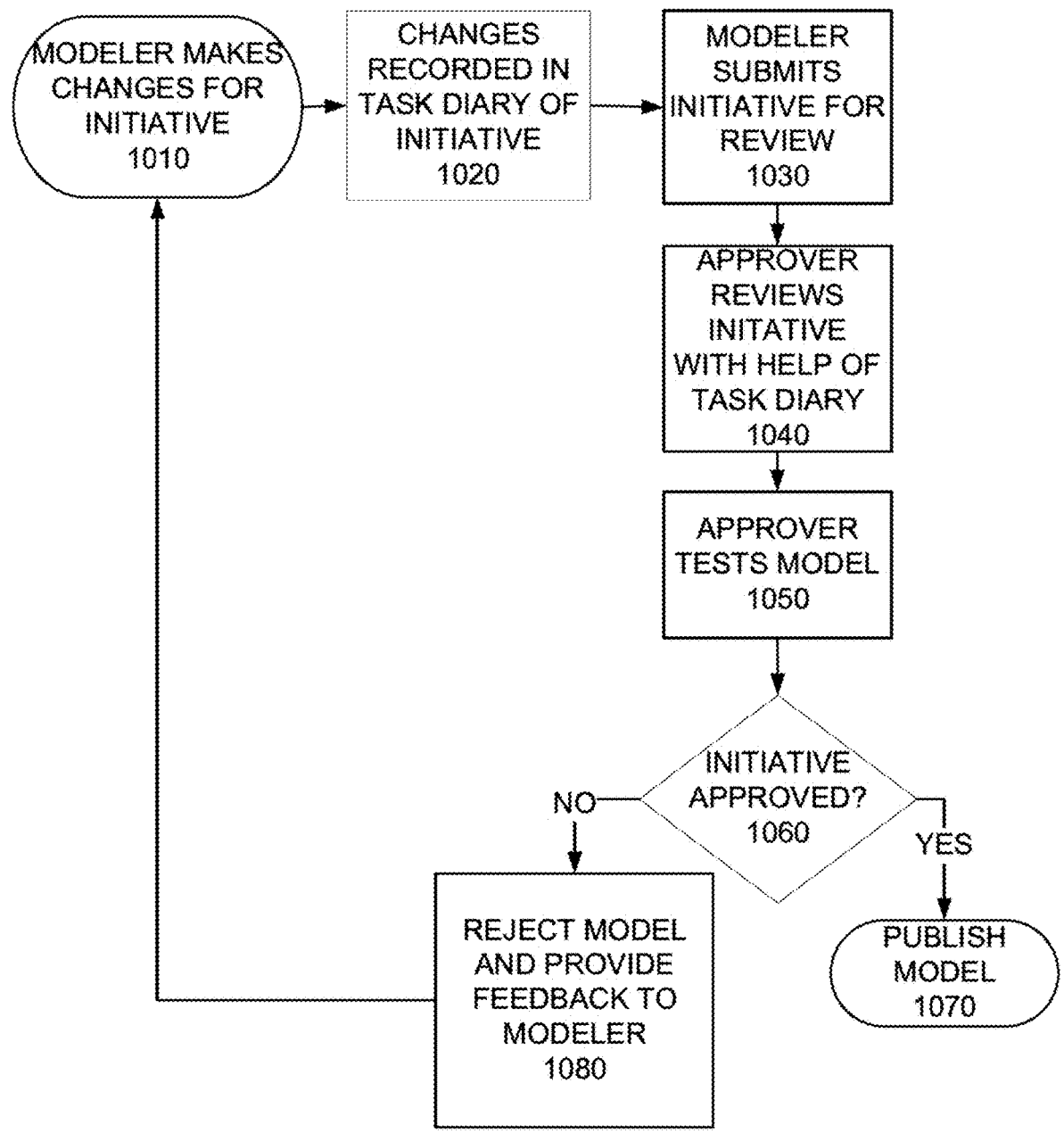
FIG. 10 illustrates a flowchart for the approval of an initiative.

Turning to FIG. 10, a flowchart showing the workflow associated with developing an initiative/product plan is shown. The method begins in block 1010 with a modeler, such as the actuary discussed above, begins by creating a new product plan. In the alternative, the modeler may make changes to the product plan in block 1010. The changes made to the product plan are record task diary associated with the initiative/product plan in block 1020. A task diary may be any component capable of logging and/or tracking a user's interactions with a document. In this regard the task diary may automatically track the changes and/or modifications made to the initiative, the user that makes those changes/modifications, and timestamp the changes/modifications. Alternatively, the task diary may managed manually by the user. That is, the user may write log entries into the task diary to track the progress of the initiative/product plan. One of ordinary skill in the art would recognize that a combination of the automatic and manual implementations described herein could be employed by the system.

After the modeler has developed the initiative/product plan or made changes to the initiative/product plan, the modeler submits the initiative/product plan to the reviewers/approvers for their review in block 1030. In block 1040, the reviewers/approvers review the initiative/product plan using the task diary described above. In this regard, the reviewers/approvers may check to ensure that the parameters set forth in the initiative request were met. Alternatively, the reviewers/approvers may review the initiative/product plan to check that it complies with company policy and applicable laws. The examples described herein are merely illustrative, and one of ordinary skill in the art would recognize alternatives from the examples described herein.

In block 1050, the reviewer/approver may test the initiative/product plan. For instance, the reviewer/approver may put the initiative/product plan through various scenarios to detect any possible flaws in initiative/product plan.

Based on the reviewer/approver reviews and the tests performed on the model initiative/product plan, a determination of whether the initiative/product plan is approved in block 1060. If the initiative/product plan is approved, then it is published on an enterprise server in block 1070. In this regard, publishing may mean making the initiative/product plan available to enterprise systems such that the initiative/product plan may be implemented in a commercial way.

If the initiative/product plan is not approved, the method proceeds to block 1080 where the initiative/product plan is rejected. Feedback may be provided to the modeler in block 1080. Feedback may include the reasons why the initiative/product plan was not approved. Additionally, feedback may include additional parts and features that the reviewer/approver thinks should be included in the initiative/product plan. One of ordinary skill in the art would recognize that the examples described herein are merely illustrative, and alternatives would be readily apparent to those of ordinary skill in the art. After block 1080, the method returns to block 1010 for the modeler to incorporate the feedback received in block 1080.

Figure 11:
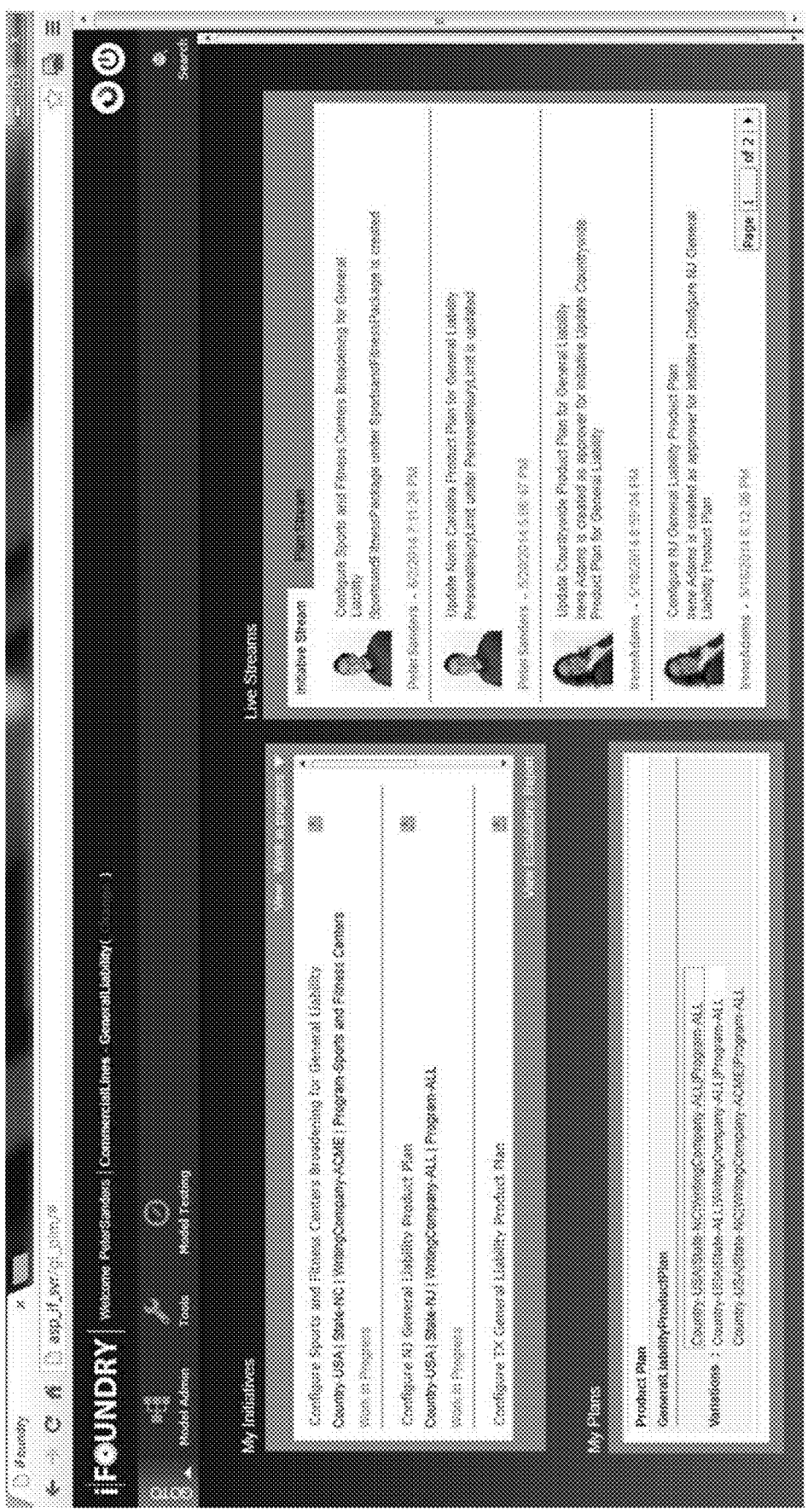
FIGS. 11-26 various examples of a graphical user interface for configuring one or more product initiatives.

An example of the dashboard is shown in FIG. 11. In this regard, the dashboard may include a "Live Streams" window, a "My Initiatives" window, and a "My Plans" window. The dashboard may include additional or fewer windows, such as an alert window or a notification window. The dashboard may include social networking and collaboration tools between the various user communities. The dashboard may also include access to a variety of dynamic product data and news to help manage the product lifecycle better.

The "Live Streams" window may provide information related to other users accessing the workbench. As described above, the workbench may include a social networking component. In this regard, the "Live Streams" feed may provide information about what other users are working on, who has been designated a reviewer/approver, messaging updates from other users, etc.

The "My Initiatives" window may include updates regarding initiatives/product plans that are assigned to the user. In this regard, the "My Initiatives" window may include tasks that are assigned to the user. That is, the "My Initiatives" window my act as a to-do list for a user. Alternatively, it may allow a user to track the workflow of the initiatives/product plans as they are assigned, reviewed, edited, etc.

The "My Plans" window may include plans that have been developed by the user or assigned to the user. In this regard, the user may keep track of the plans that he/she has written to refer to them in subsequent plans as described above.

Figure 12:
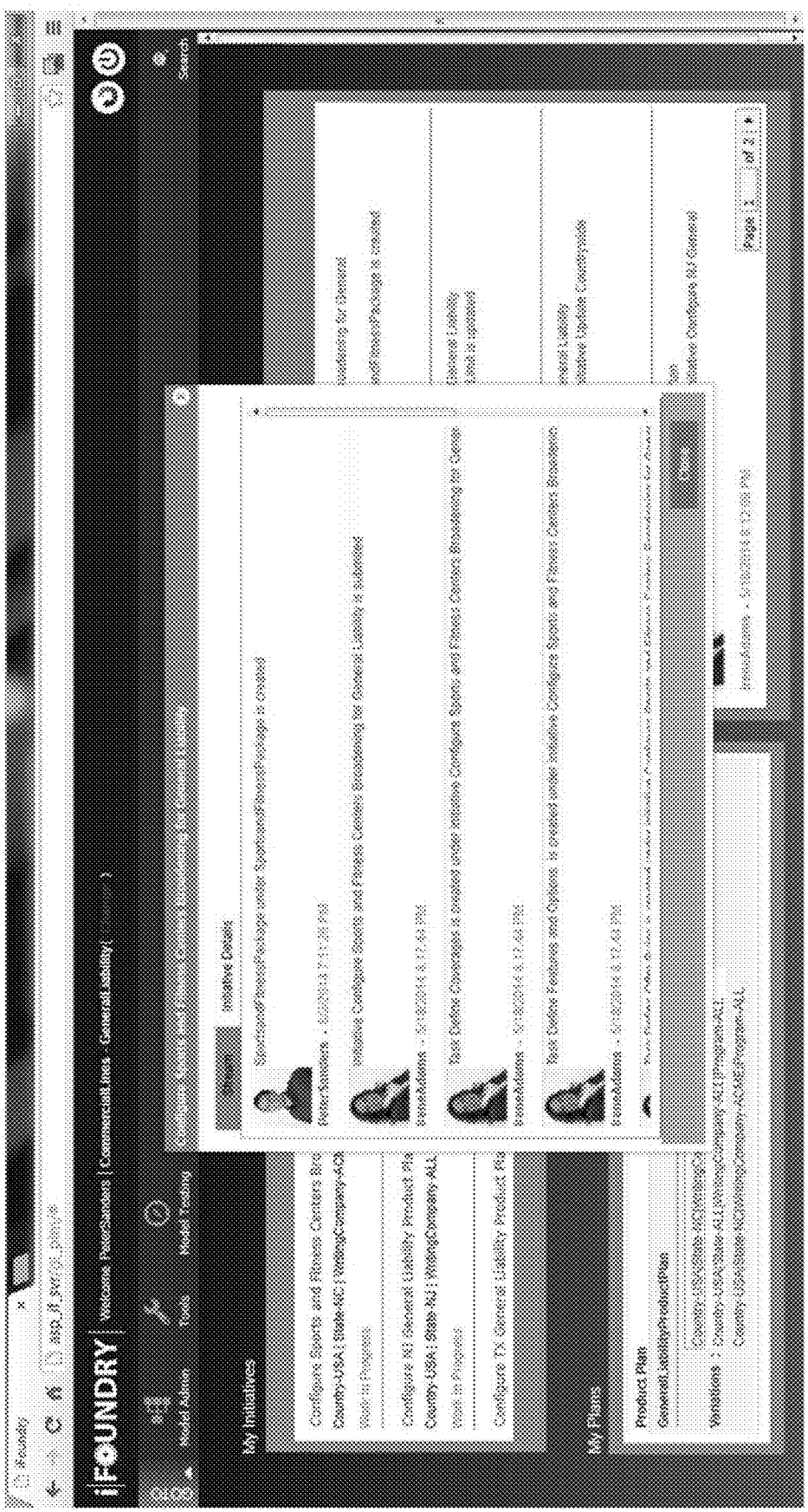

FIG. 12 illustrates a screenshot of a user clicking on one of the links provided in the "My Initiatives" window. According to FIG. 12, the user has clicked on the "Configure Sports and Fitness Centers Broadening for General Liability." By clicking on one of the links under "My Initiatives" a list of tasks to be performed may be displayed. That is, the link displays what has been done, what still needs to be done, and what is currently under review. In this regard, the dashboard provides a quicker and easier method for tracking the workflow of an initiative/product plan.

Figure 13:
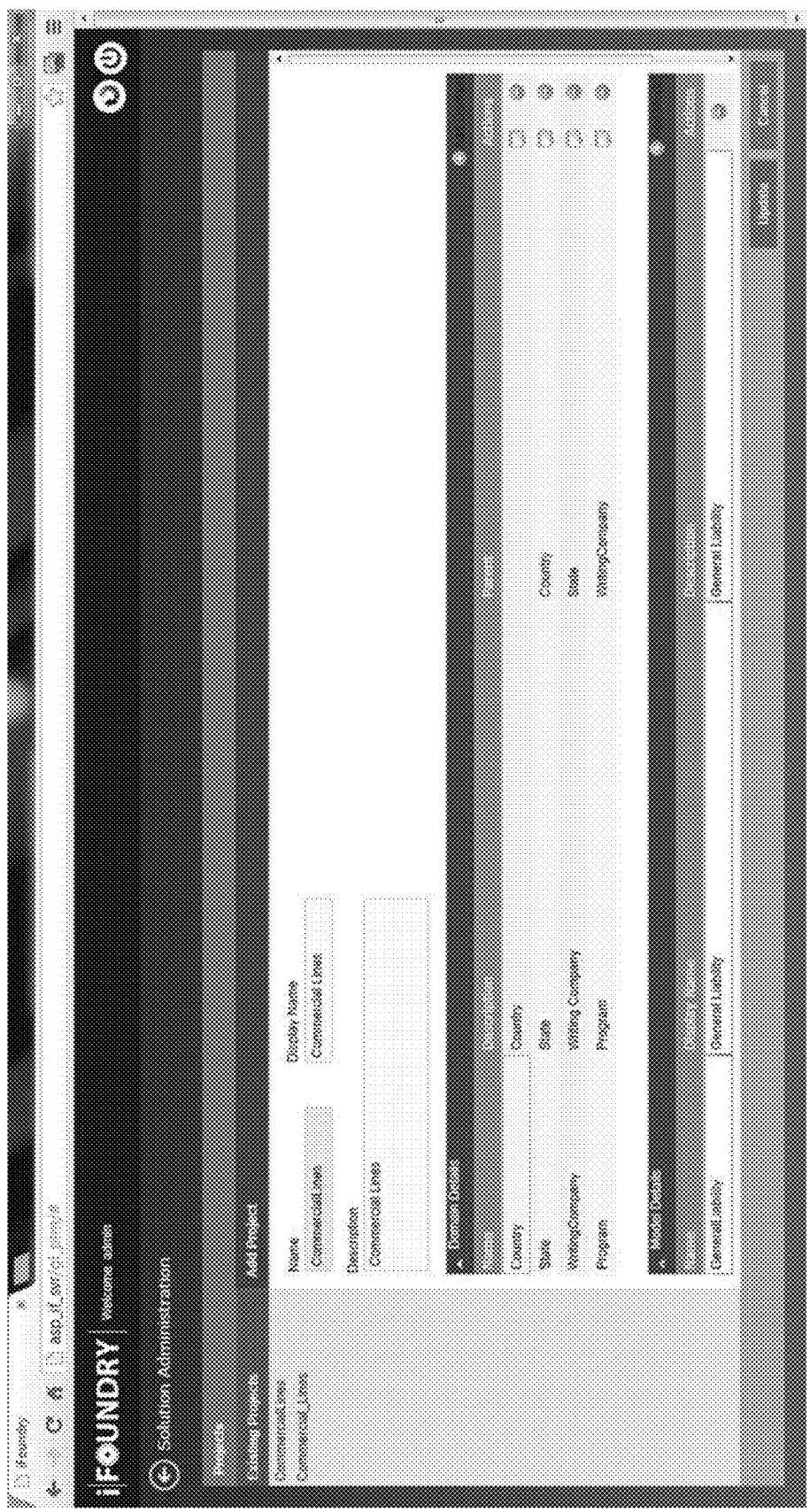

Turning to FIG. 13, a screenshot of the initiative/product plan creation screen described above with respect to block 910 of FIG. 9 is shown. In this regard, an administrator may add and assign a project. FIG. 13 indicates that the administrator may specify certain details with respect to the initiative product plan. The details may include the name of the project, a description of the product, where it is applicable (e.g. nationwide or state), the request (e.g. the company requesting the work), etc. Editing options are also shown in the far right column of FIG. 13.

Figure 14:
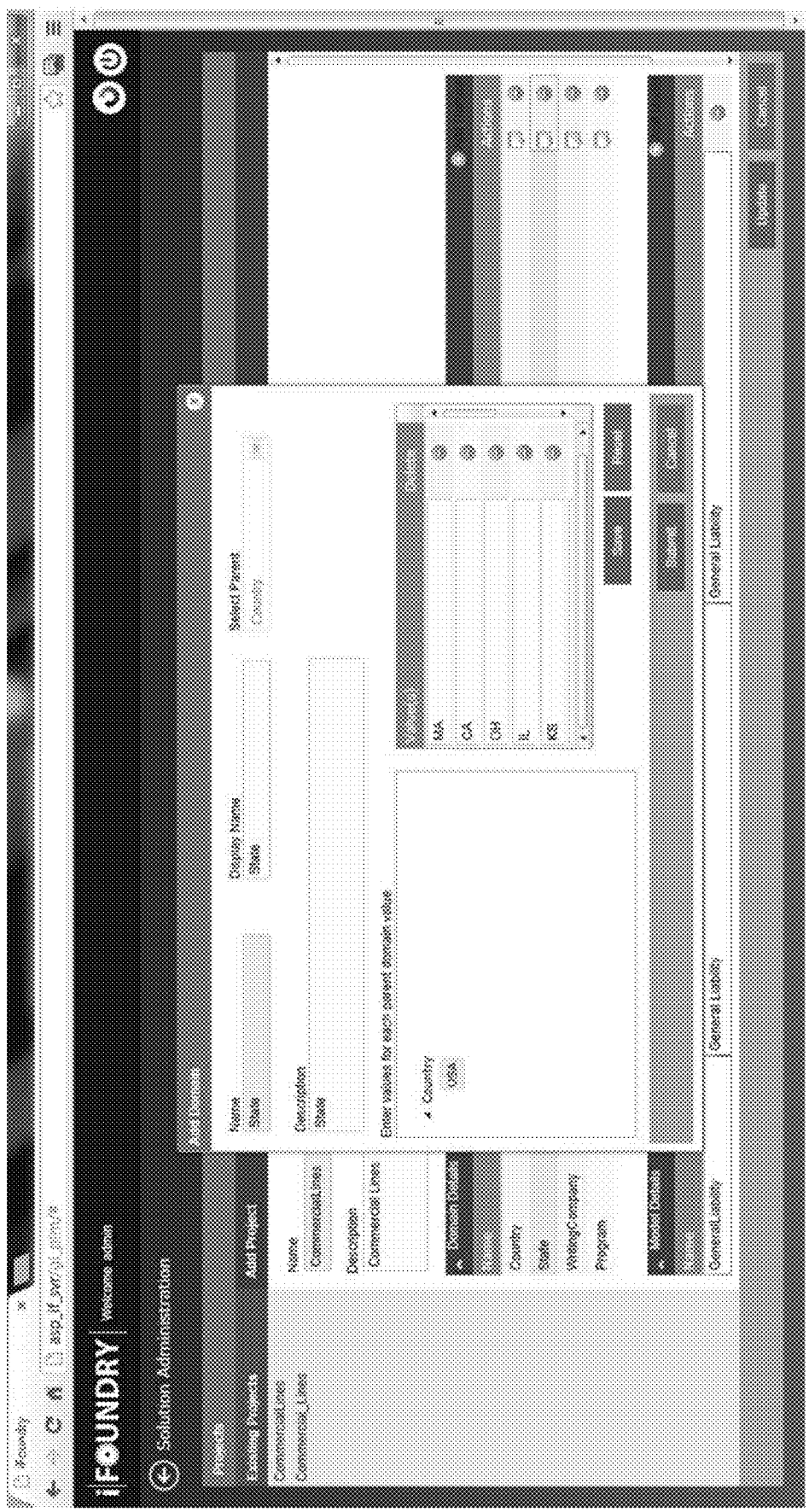

Turning to FIG. 14, a screenshot of one of the editing options is shown. FIG. 14 shows adding a domain to the initiative/product plan. That is, a user may include additional domains (e.g. states) to be included in the initiative/product plan. Additionally, a user may rename the option, provide a description, define parent domain values, etc. Alternatively, the user may write in the values or enter the values from a check list, drop-down menu, etc. Domains play a key role in controlling versions of products and product models. Accordingly, reuse and refer capabilities may be delivered using the domain capabilities supported in the system.

Figure 15:

FIG. 15 shows a screenshot of the dashboard for creating a product plan. In this regard, a user has been tasked with creating a plan. The dashboard allows the user to select an option to create or add a product plan. According to FIG. 15, the user may specify the product plan name and plan type. As illustrated, the product plan name is "General Liability Product Plan." The plan type may correspond to the product model used to develop the product plan. Additionally, the user may specify the domains applicable to this product plan. For example, FIG. 15 shows defining the "Country," "State," "WritingCompany," and "Program" information. The "Country" domain may indicate the highest level domain. As shown in FIG. 15, the country value is "USA." Meanwhile, the "State" domain may indicate the next level domain where the product plan may be applicable. FIG. 15 shows that the product plan being developed would be applicable in Massachusetts, California, Ohio, Illinois, Kansas, North Carolina, West Virginia, North Dakota, and Texas. The "WritingCompany" domain may indicate the company or companies that have requested the product plan. Finally, the "Program" domain may indicate additional information about the product plan, such as the locations where it may be applicable. In this regard, FIG. 15 shows that the "General Liability Product Plan" may be applicable to "Sports and Fitness Centers" and "Religious Centers." While only four domains are shown, one of ordinary skill in the art would recognize that more or fewer domains could be specified. Additionally, FIG. 15 shows that the domain information is selected using a drop-down menu. However, one of ordinary skill in the art would recognize that other means for selecting options may be used, such as check boxes or manually entering the information.

Referring to FIG. 16, an example of creating and building a product model is shown. As described above with respect to FIGS. 7-10, a user or group of users may be assigned to develop a product model. Using the dashboard, a user may select one of the fields under the "Type" heading to build the product model. As shown in FIG. 16, the user may select a business object type ("BO"), a "Product" type, a "Part" type, a "Feature" type, or a "CompositeFeatures" type. As illustrated, the user has selected a "Product" type. Accordingly, the products that have been assigned to the user may be subsequently displayed in another window. As shown in FIG. 16, a "General Liability Product" is displayed in a window under the "Factor Groups" heading. FIG. 16 represents screen shots used to define a business object model for the product model. The business object model controls the structure of the product model. For example, the structure to capture "General Liability Product" definitions is controlled by the business object model shown in FIG. 15. As noted above, administrators define business object models for the desired product model. The product modelers then build products based on the defined business object model.

The user may select one of the products that have been assigned to him/her under the "Factor Groups" heading. As shown in FIG. 16, the user may select the "General Liability Product." Upon selecting the product, an additional window (i.e. "Factors") may be displayed showing the factors that may be included in the product. In this regard, the factors that may be included in the "General Liability Product" include "Name," "Display Name," "Description," "Context," "Broadening Option," "Operations Info," "Class Code," "Limit," "Deductible," "Additional Info String," "Package," and "Location." While several factors are shown, one of ordinary skill in the art will recognize the list of factors is not exhaustive and that additional factors may be used to define the product model. Also, the list of factors can be configured by the administrator and is not predefined in the system. Conversely, the product may have fewer factors associated with it. Accordingly, the user or group responsible for implementing the product model may have to provide information for each of the factors displayed. This is a definition environment which controls options and sections which will be available to the modelers while they define the product.

Referring to FIG. 16, the "Location" factor is shown as being selected. Accordingly, an additional window may be displayed. This window may show the factor attributes and their corresponding values that are included in the selected factor. As shown, the "Coverage" factor includes a "Factor Name" attribute, a "Display Name" attribute, a "Description" attribute, a "Occurrence" attribute, a "DataType" attribute, a "Complex DataType" attribute, a "Visible" attribute, and a "Mandatory" attribute. Additionally, FIG. 16 illustrates the values associated with each factor attribute. Furthermore, the window may include an option to modify, or otherwise edit, the factor attributes displayed. While eight factor attributes, and their corresponding values, are shown, one of ordinary skill in the art would recognize that more or fewer factor attributes may be included in each factor group. As illustrated in FIG. 16, "Location" is shown as a complex type. The complex type means that a product model allows hierarchical structures where one factor group can contain other complex factor groups.

In this regard, a user or group may have to provide information for each of the factors associated with the selected factor. For example, the user may have to enter factor information for "Name," "Display Name," "Description," "Limit," "Deductible," and "Coverage" before being able to submit the selected part to a reviewer/approval for review. In the alternative, the user may be able to submit the coverage factor for review/approval independently of the other factors specified in the factor group. In this regard, the system may provider finer granularity for the development and management of the product plan.

Figure 17:
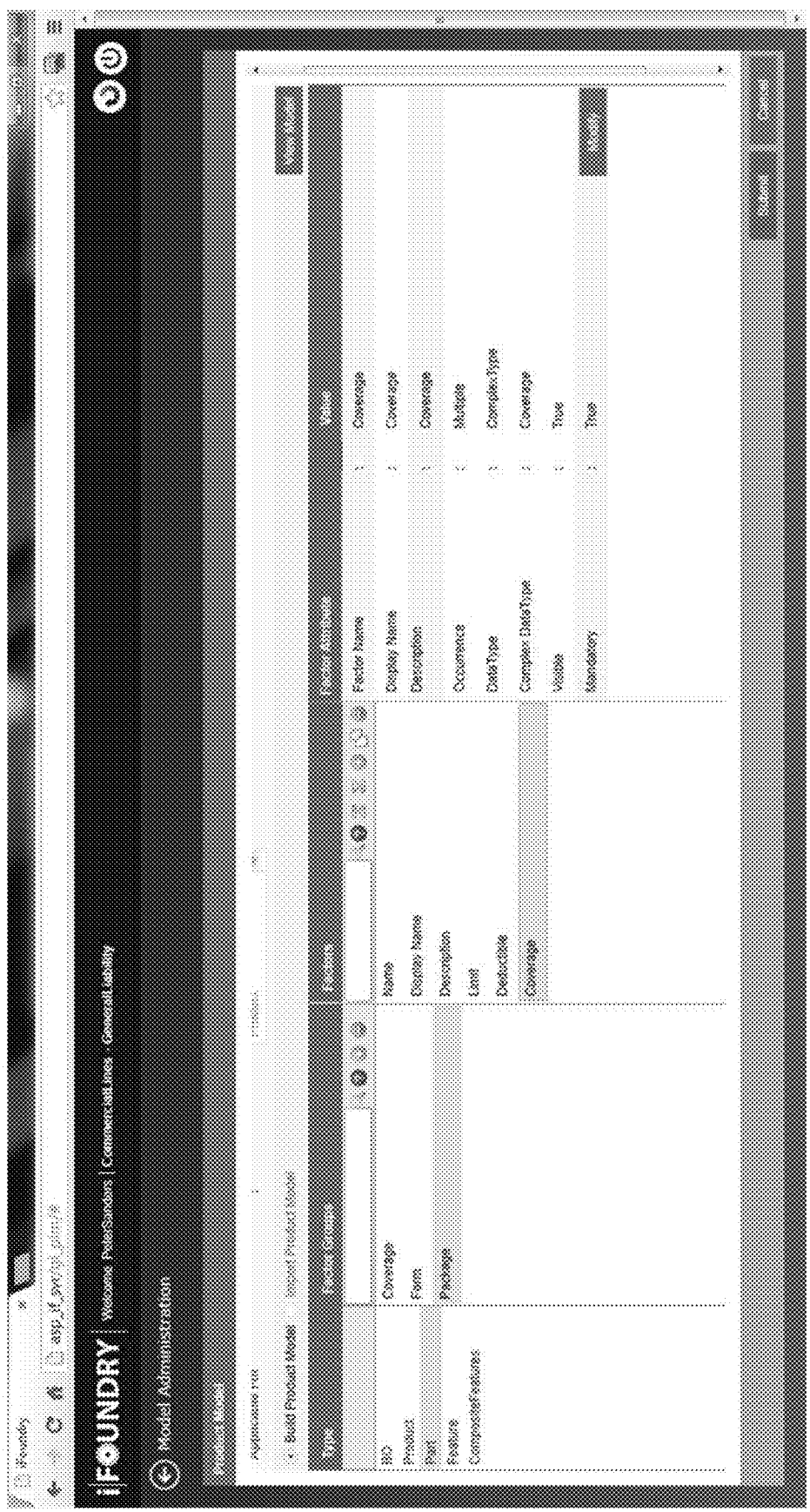

Turning to FIG. 17, an exemplary screenshot of building a part of the product model is shown. As described above with respect to FIGS. 7 and 8, a user may select one of the fields under the "Type" heading to build the product model. As described above with respect to FIG. 16, the user may select a business object type ("BO"), a "Product" type, a "Part" type, a "Feature" type, or a "CompositeFeatures" type. As illustrated, the user has selected a "Part" type.

Once the user selects one of the options available under the "Type" heading, a window providing additional options may be displayed to the user. Accordingly, the user has selected to build a part of the product model. The user may be prompted to select one of the fields from the "Factor Groups." Referring to FIG. 17, the "Factor Groups" may include "Coverage," "Form," and "Package." While only three options are shown under the "Factor Groups" heading, one of ordinary skill in the art would recognize that more or less factor groups may be displayed.

Referring to FIG. 17, the user selects the factor group "Package." Another window (i.e. "Factors") may be displayed showing the factors that may constitute the selected factor group. As shown in FIG. 17, this window is labeled "Factors." The factors that go into the "Package" factor group include "Name," "Display Name," "Description," "Limit," "Deductible," and "Coverage." While only five factors are shown, one of ordinary skill in the art may recognize that additional factors may be used to define the factor group. Conversely, certain factor groups may have fewer factors. Accordingly, the user may have to supply information for each of the factors displayed in the factor group. As noted above, some of this information may be entered manually, such as being typed in by the user. Alternatively, the user may have options available to him/her to select the factor attribute values. Still further, some of the factor attribute values may be filled in automatically according to the product plan or default values.

Referring to FIG. 17, the "Coverage" factor is shown as being selected. Accordingly, an additional window may be displayed. This window show the factor attributes and their corresponding values that are included in the selected factor. As shown, the "Coverage" factor includes a "Factor Name" attribute, a "Display Name" attribute, a "Description" attribute, a "Occurrence" attribute, a "DataType" attribute, a "Complex DataType" attribute, a "Visible" attribute, and a "Mandatory" attribute. Additionally, FIG. 17 illustrates the values associated with each factor attribute. Furthermore, the window may include an option to modify, or otherwise edit, the factor attributes displayed. While eight factor attributes, and their corresponding values, are shown, one of ordinary skill in the art would recognize that more or fewer factor attributes may be included in each factor group.

A user may have to enter information for each of the factors associated with the selected factor group. Referring to FIG. 17, the user may have to enter factor information for "Name," "Display Name," "Description," "Limit," "Deductible," and "Coverage" before being able to submit the selected part to a reviewer/approval for review. In the alternative, the user may be able to submit the coverage factor for review/approval independently of the other factors specified in the factor group. In this regard, the system may provider finer granularity for the development and management of the product plan.

Figure 33:
Figure 34:
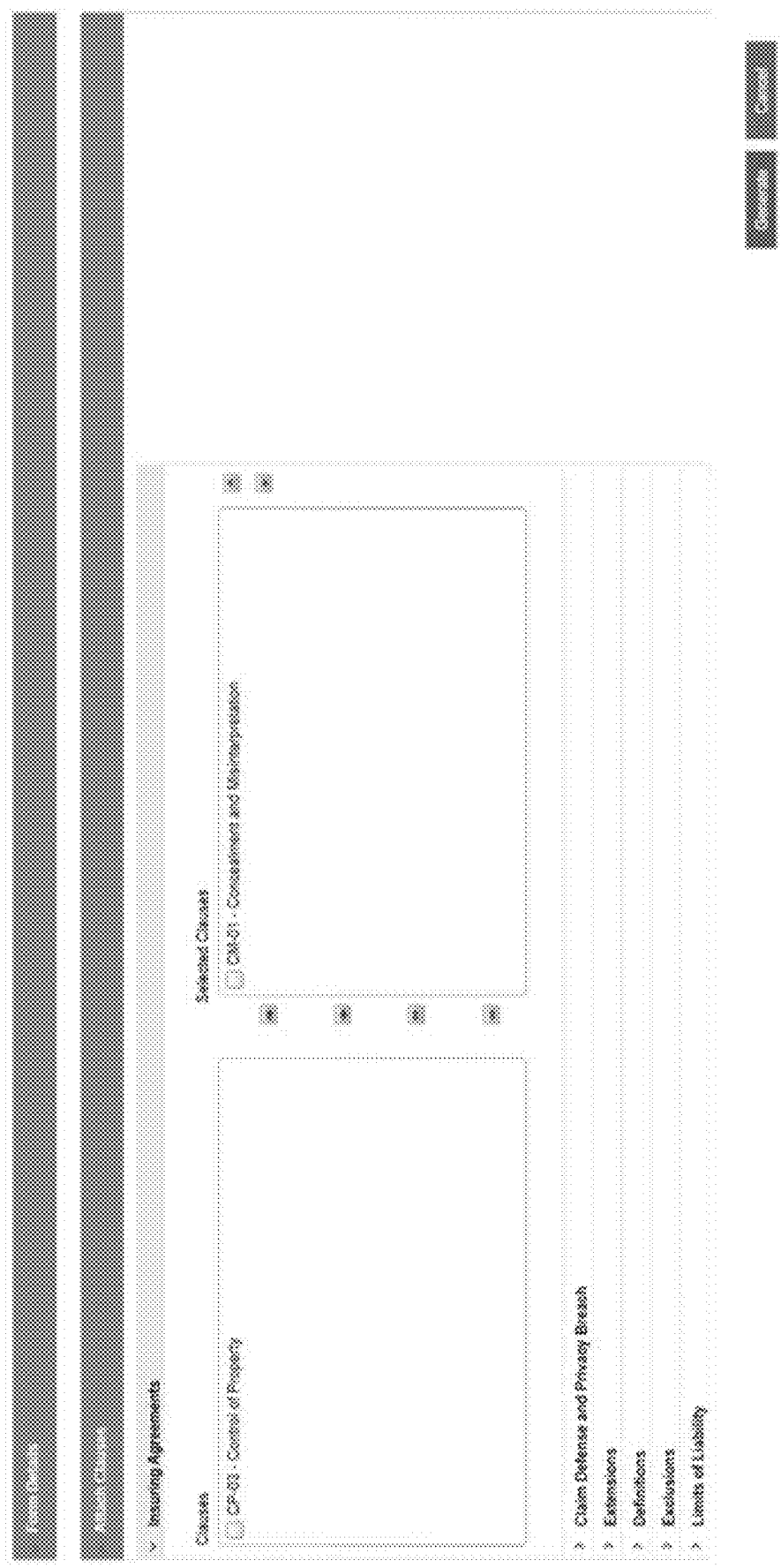

Clauses may be searched and selected for use in creating a product, part, feature, or option. For example, as shown in FIG. 32, a user may search for a known clause. Upon completion of the search, the clauses names and description, including the language of the clause may be displayed to the user. The user may then submit the selected clause and have it be appended onto the form, as shown in FIG. 33.

Clauses may also be organized into categories for use in creating a product. For example, an interface including clauses separated into categories may be presented to the user. In the example screenshot shown in FIG. 34, a user may be presented with a list of categories associated with an insurance product. The categories may each include clauses which may be appended onto the product. For example, a user may select clause "CM-01" from the "Clauses" list, and place it into the "Selected Clauses" list. Based on all of the "Selected Clauses," a form may be generated which includes each selected clause as found in the clause and forms repository 414. The clauses sections in FIG. 34 may be indicative of a section in a document template. Using the modeling environment, user associates may select a clause from clause list, which may be placed into the section in the document template from which it was selected. Accordingly the final forms may be generated from the templates and selected clause list.

Figure 18:
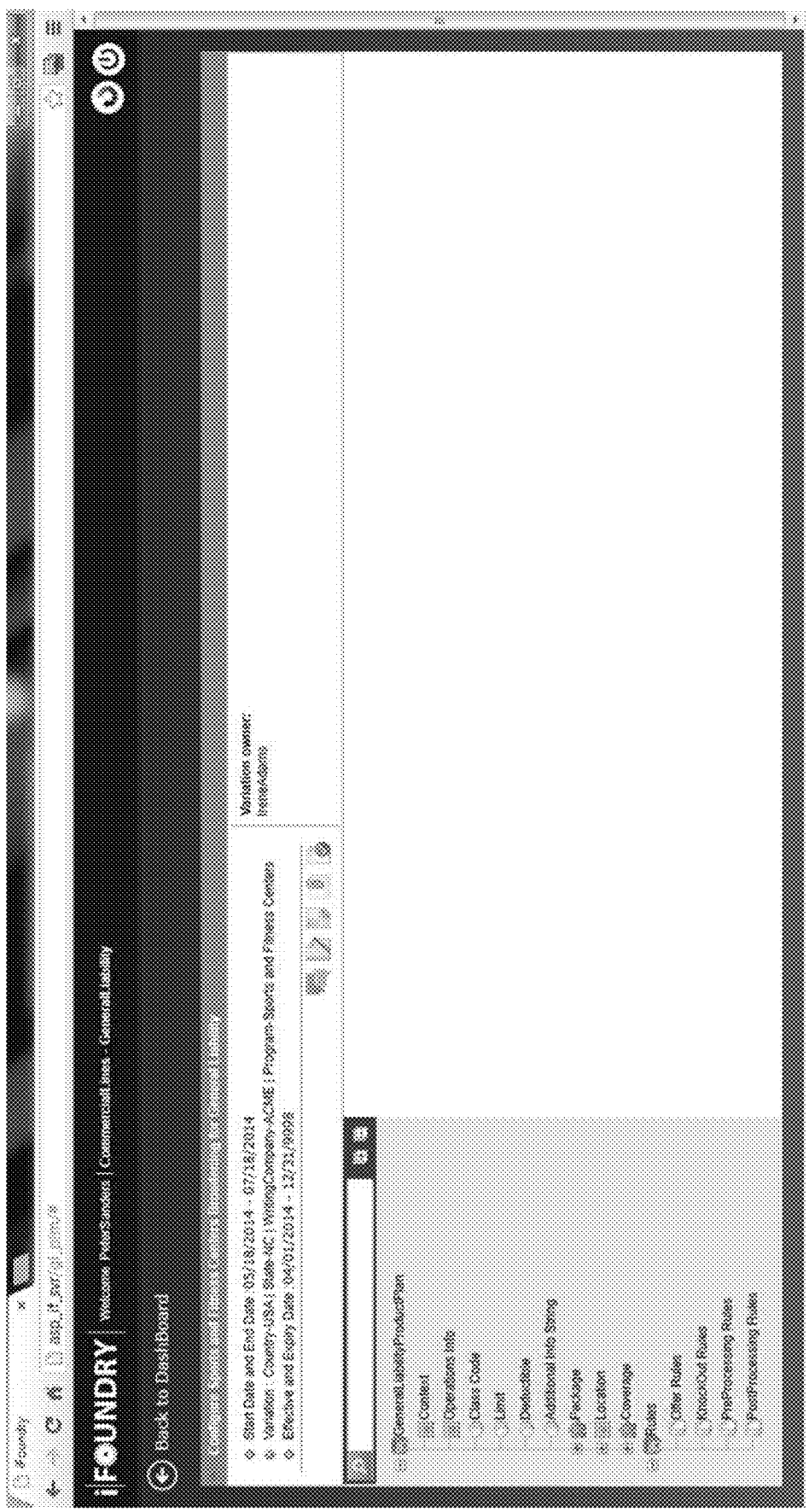

Referring to FIGS. 18-23, screenshots of compiling the product model are shown. Turning to FIG. 18, the dashboard may show a hierarchical view of the product plan model. In this regard, the user or group of users may be assigned a task entitled "Configure Sports and Fitness Centers Broadening for General Liability." The user may be able to specify a period of time that this product is available. For instance, the product plan model may only be available from May 18, 2014 through Jul. 18, 2014. Additional information, such as variants of the product plan may also be available on this screen. The dashboard view may include the date the product plan goes into effect and when it expires. The dashboard may also include options to edit this information. FIG. 18 also illustrates the product hierarchy based on the business object model structure defined by the administrator. The product structure and its hierarchy can be completely configured and driven by the definition of the product model as shown in FIG. 17.

Referring to FIG. 18, the left column of the dashboard display may illustrate a hierarchical view of the product plan model. That is, the hierarchical view displays various components that may be included in the product. Referring the insurance policy example described above, these components may include a context information, operations information, a class code, limit information, deductible information, package information, location information, coverage information, and applicable rules. One of ordinary skill in the art will recognize that this list is not exhaustive and other components may be swapped into or added to the product plan model. Accordingly, a user may select any of the fields to display the information related to that field. Additionally, the user may be able to select packages and coverages defined above as discussed with respect to FIGS. 16 and 17.

Figure 19:
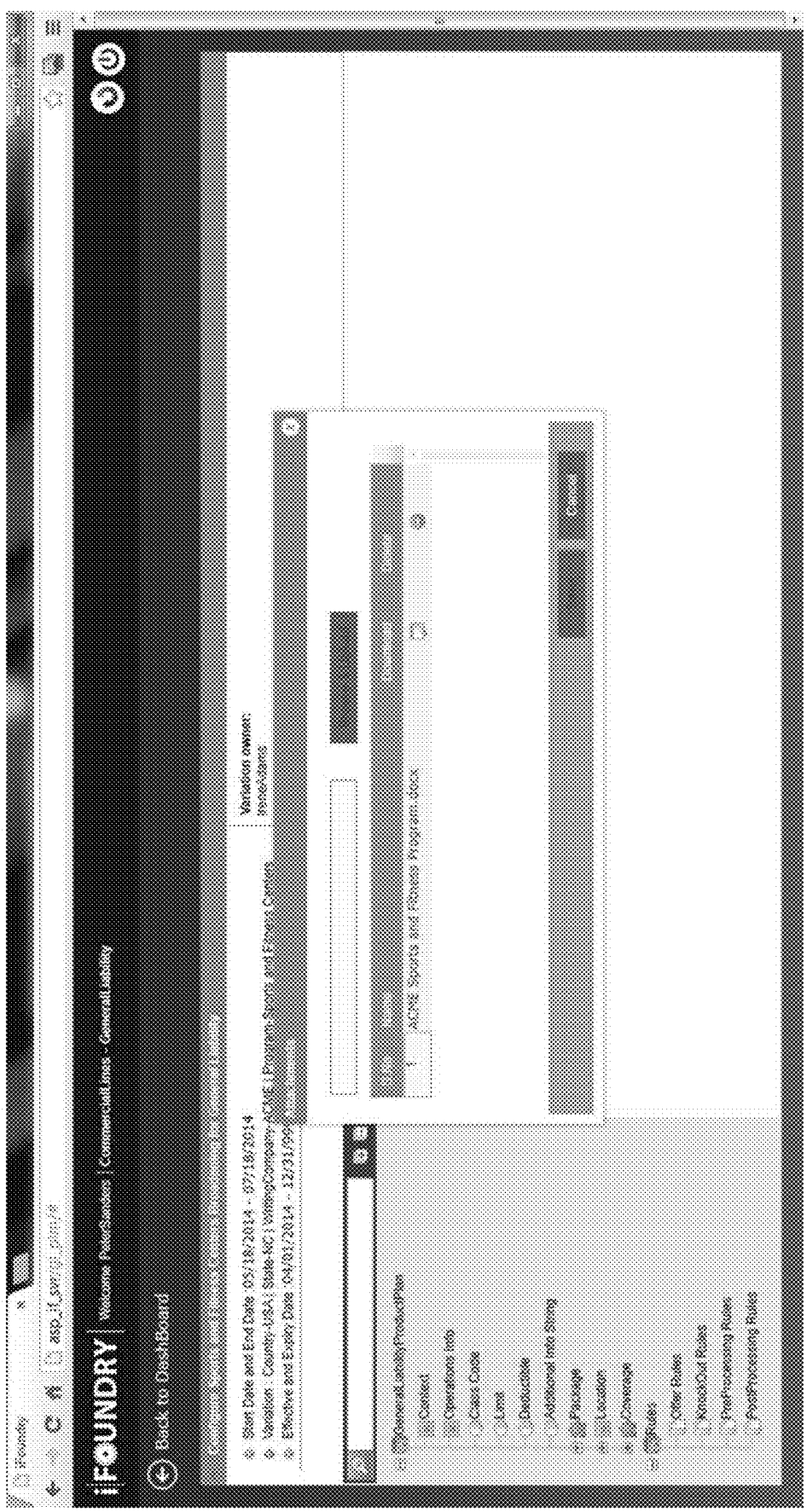

Turning to FIG. 19, an example of uploading a pre-existing product plan model is shown. In this regard, the user may uses the pre-existing product plan model to develop a variant to an already existing product plan. FIG. 19 shows the user uploading a product plan entitled "ACME Sports and Fitness Program."

Figure 20:
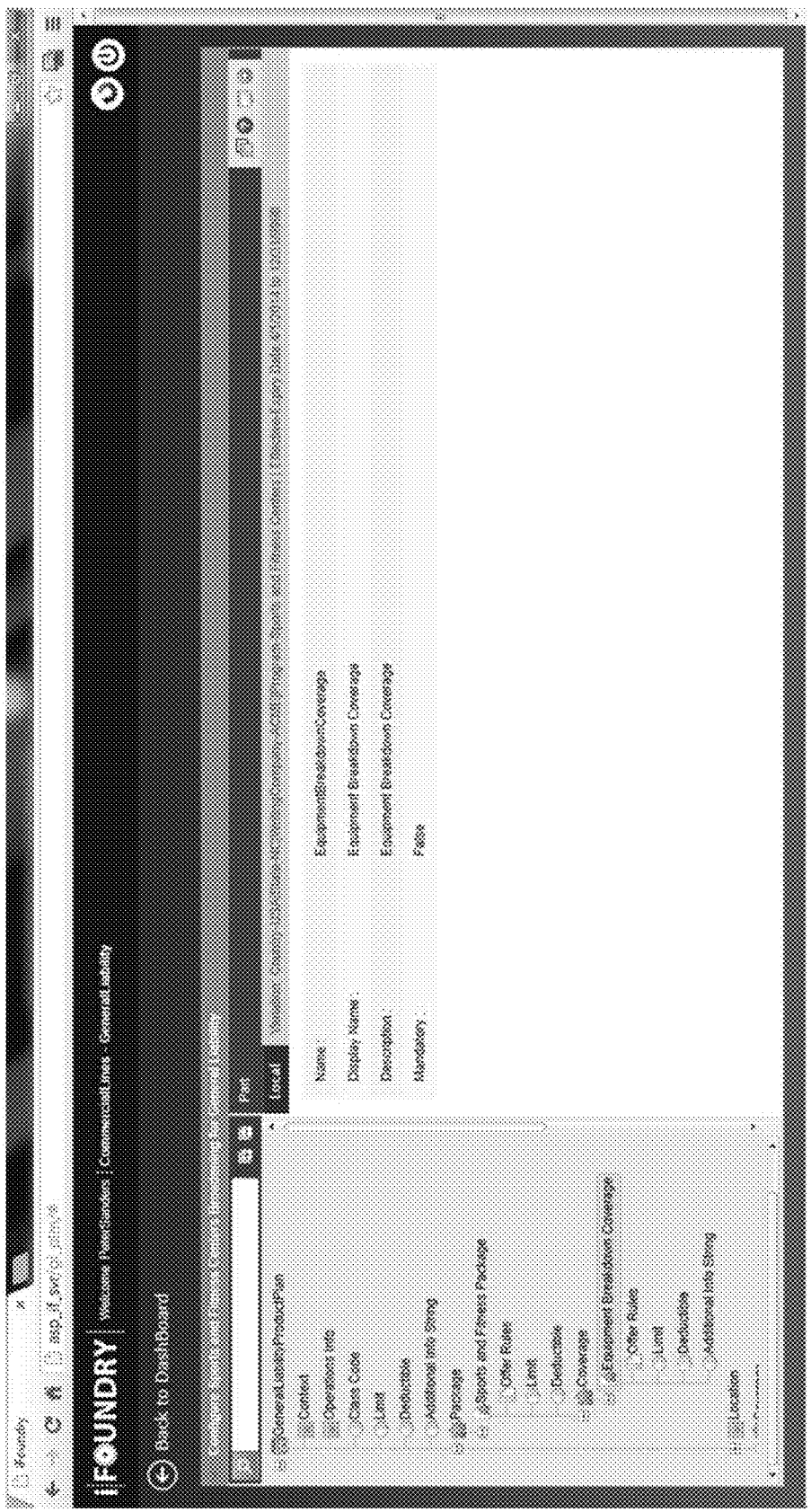

Referring to FIG. 20, a screenshot of the packages that may be included in the general liability product plan are shown. In this regard, the product plan may have packages added or deleted based on need or preference. FIG. 20 shows that a "Sports and Fitness Package" has been included in the product plan. From this view, the user may be able to view the components of the package. Additionally, the user may be able to add additional coverages to the "Sports and Fitness Package." As shown in FIG. 20, the user may add an "Equipment Breakdown Coverage" to the "Sports and Fitness Package." Additional coverages may be added to packages according to need or preference. The structure of a product containing packages, and packages containing coverages, may be governed by the structure defined for the product model as shown in FIG. 17.

Figure 21:
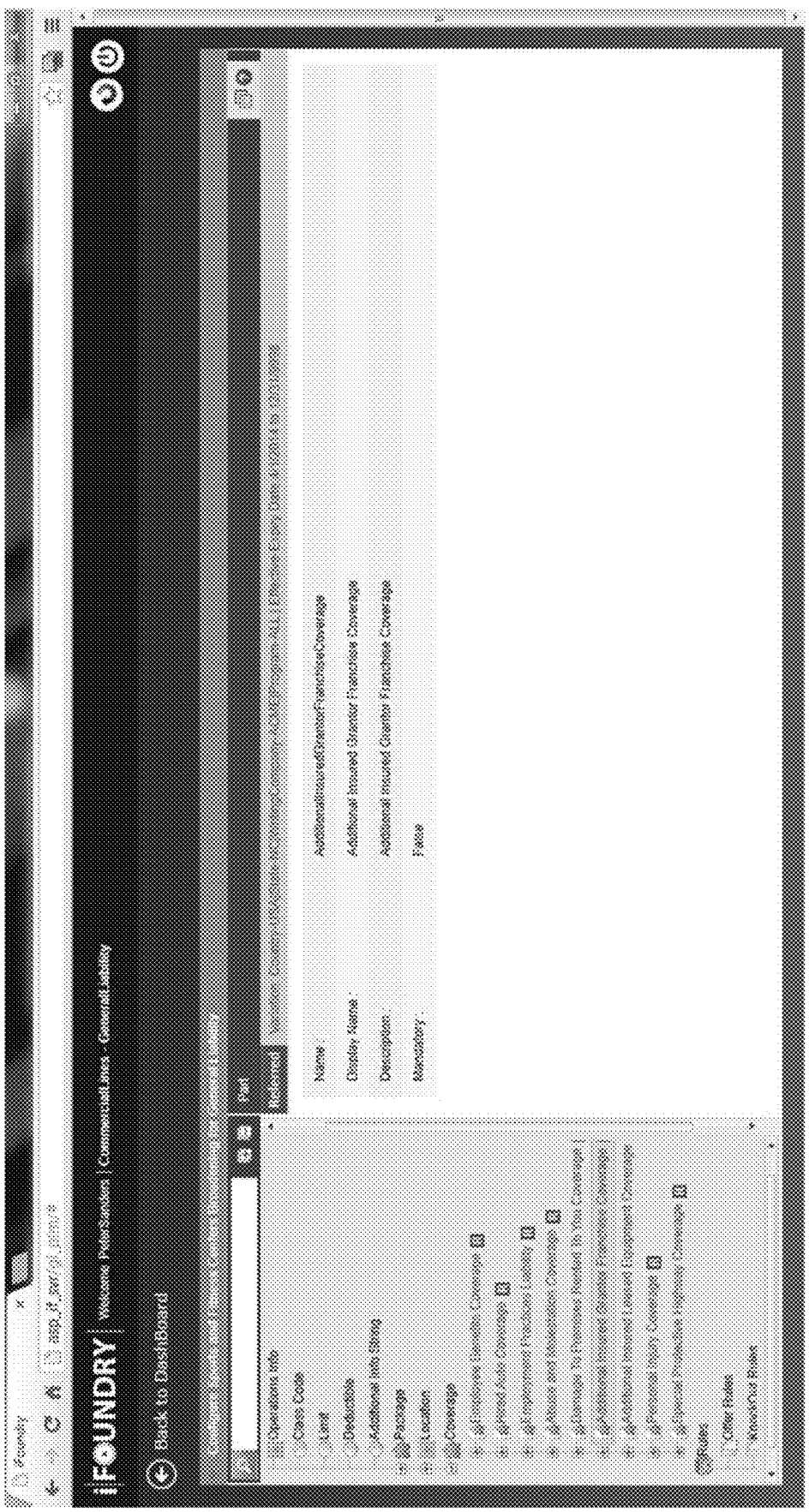
Figure 22:
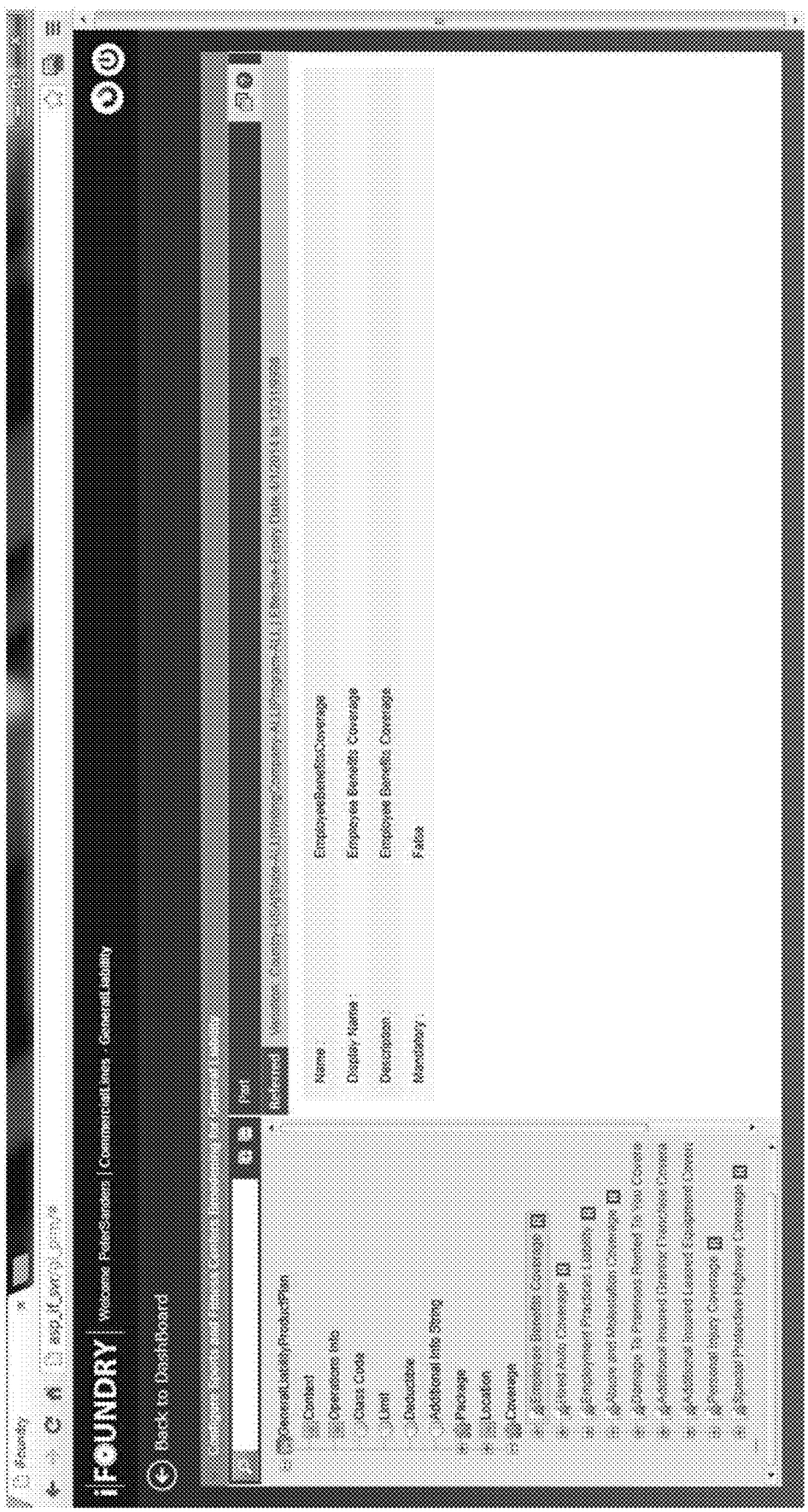
Figure 23:
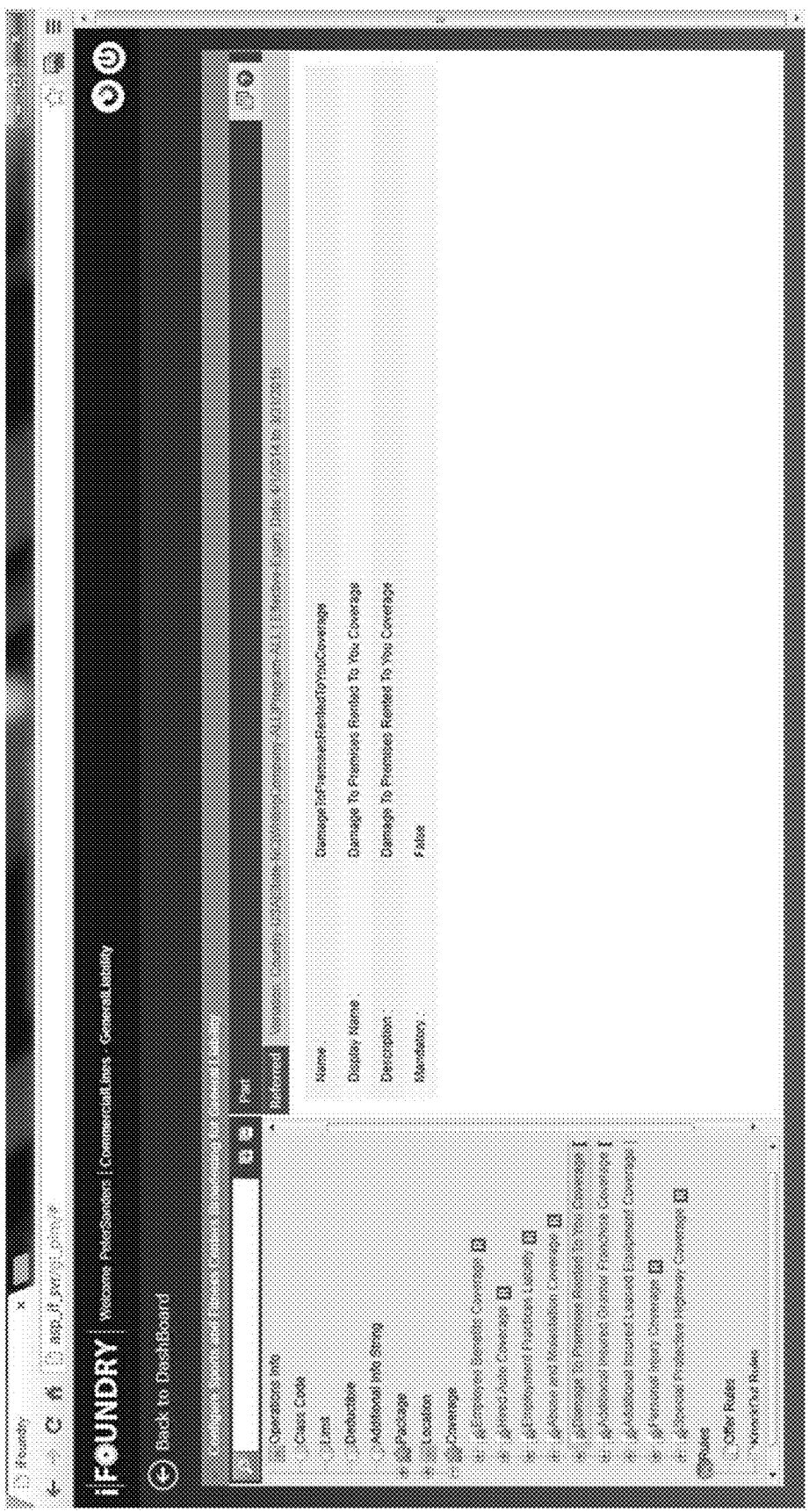

Turning to FIGS. 21-23, screenshots of the coverages included in the product model are shown. Accordingly, the product plan model may include any number of coverages. As shown in FIGS. 21 and 22, there are nine additional coverages included in the product plan model. These coverages may include additional employee benefits coverage, damage to premises, personal injury coverage, etc.

FIG. 21 illustrates that the "Additional Insured Grantor Franchise Coverage" has been selected. Accordingly, additional information related to the coverage may be provided. In this regard, the coverage may refer to a component described in another product plan. This may be relayed to the user in a variety of ways. For example, a pop-up notification may be displayed or a flag may be used. As shown in FIG. 21, the coverage includes an [R] next to it in the hierarchy display to indicate that the coverage refers to a component in another product model. Additionally, the term "Referred" may be displayed in a different color text to convey that this coverage refers to a component in a different product plan.

FIG. 22 shows the "Employee Benefits Coverage" has been selected. Accordingly, additional information related to the coverage may be provided. Similar to the "Additional Insured Grantor Franchise Coverage" discussed above with respect to FIG. 21, the coverage may refer to another component described in different product plan. As discussed above, the referral may be conveyed to the users via a pop-up notification or a flag. Similar to FIG. 21, the coverage includes an [R] next to it in the hierarchy display to indicate that the coverage refers to a component in another product model. Additionally, the term "Referred" may be displayed in a different color text to convey that this coverage refers to a component in a different product plan.

FIG. 23 illustrates a "Damage to Premises Rented to You Coverage" that has been selected. As with FIGS. 21 and 22, additional information regarding the name of the coverage, its description, and whether it is mandatory may be displayed. Accordingly, additional information may displayed, such as the details of the coverage, the limits, deductible information, etc. Similar to the previous two coverages discussed, this coverage makes reference to another product plan and includes an [R] and the term "Referred" to convey this to the user.

As discussed above, if the referred to component changes (i.e. the feature, part or coverage described in another product plan), an alert may be generated to notify the user. For example, the [R] next to the coverage name may change color (i.e. to red). Alternatively, the "Referred" displayed may also change color or flash. In other examples, a pop-up notification or other type of notification may be displayed to the user to indicate that the referred to component may have changed or may be set to expire soon. In some embodiments, alerts may be sent as an email, or a notification may appear on the workbench. Further, alerts may use other digital channels such as mobile, tablets and their communication platforms to send the alerts and notifications via email, SMS, push notifications, etc.

In this regard, the user has an opportunity to refer to a component in a different product plan, implement a component specific to this product plan model, or keep referring to the earlier version of the component.

Referring to FIG. 7, the core product meta-model structure allows the relationship between parts to be hierarchical. That is, complex parts can be modeled in the product model. For example, in an insurance policy, a complex packaged part may contain one or more coverages. This relationship may vary for different products. By defining a product model to support complex structures, such interrelationships can be built in to the system easily. FIG. 20 shows a "Sport and Fitness Package" which contains "Equipment Breakdown" Coverage. That is, when a customer purchases "Sports and Fitness" package, the system automatically offers additional "Equipment Breakdown" coverage. In addition to packages, FIG. 21 shows independent coverages that may be offered for general liability. It is also important to note that coverages can be reused across multiple packages depending on how a product model is created for a line of business. For instance, "Equipment Breakdown" coverage can be offered for "Sports and Fitness" package and also "Earth Quake" coverage. This capability allows extensive reuse of parts and features across the system.

Figure 24:
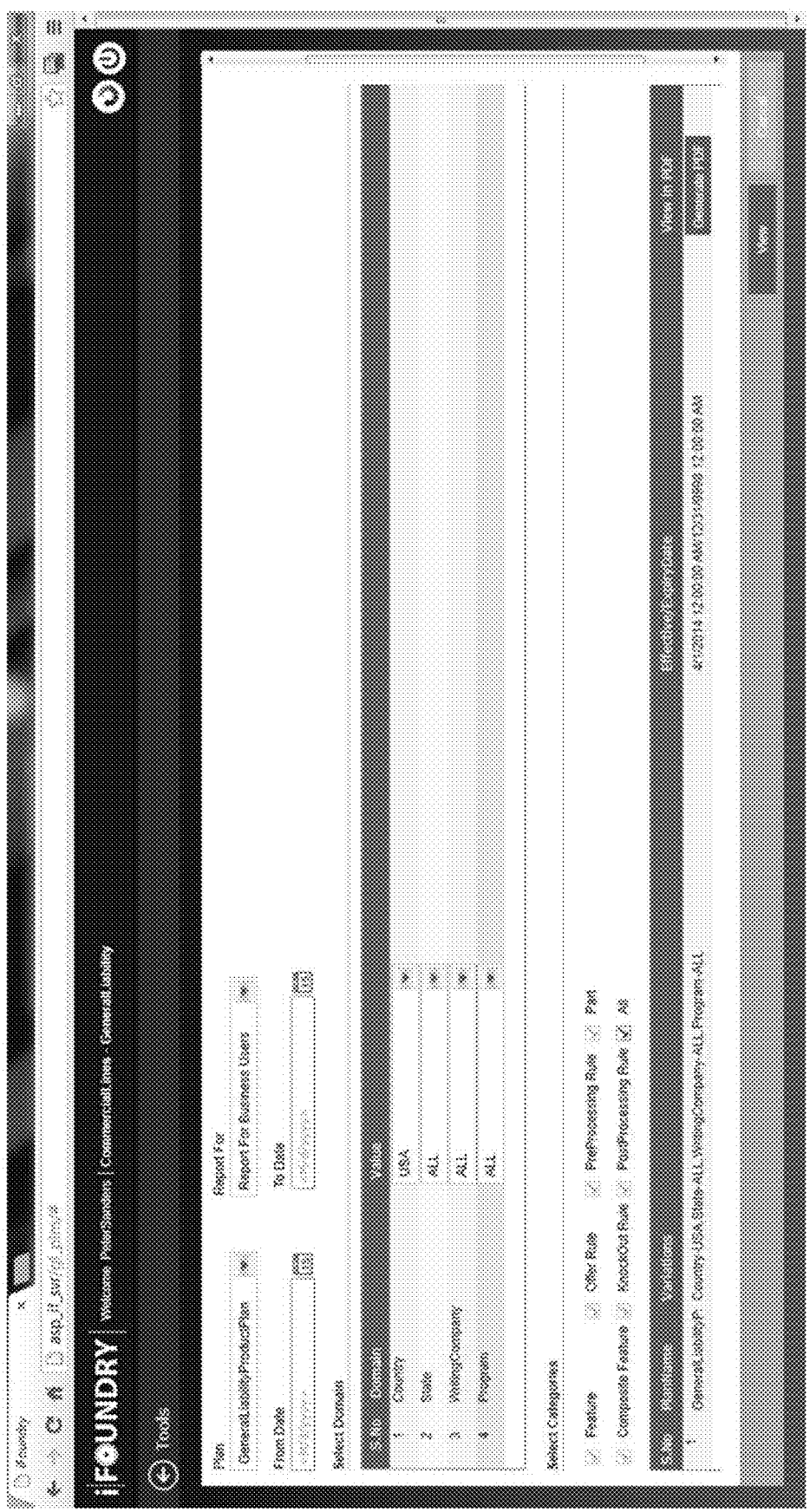

Turning to FIG. 24, a screenshot of the test screen. In this regard, the product plan model may be completed by the user or group of users. As discussed above, the product plan model may be subjected to testing. This testing may include pre-processing rules, post-processing rules, knockout rules, offer rules, etc. As shown in FIG. 24, the user may be able to run tests according to the rules illustrated. That is, the product plan model may be subjected to analysis to ensure that it complies with various rules. As noted above, these rules may be state or federal laws. Additionally, these rules may include the company's preferences or policies that should be complied with. In this regard, the user may check the boxes of the rules that should run on the product plan. Additionally, FIG. 24 illustrates that the dashboard may allow the user to generate a document, such as a PDF or a PostScript file, of the product plan model.

Figure 25:
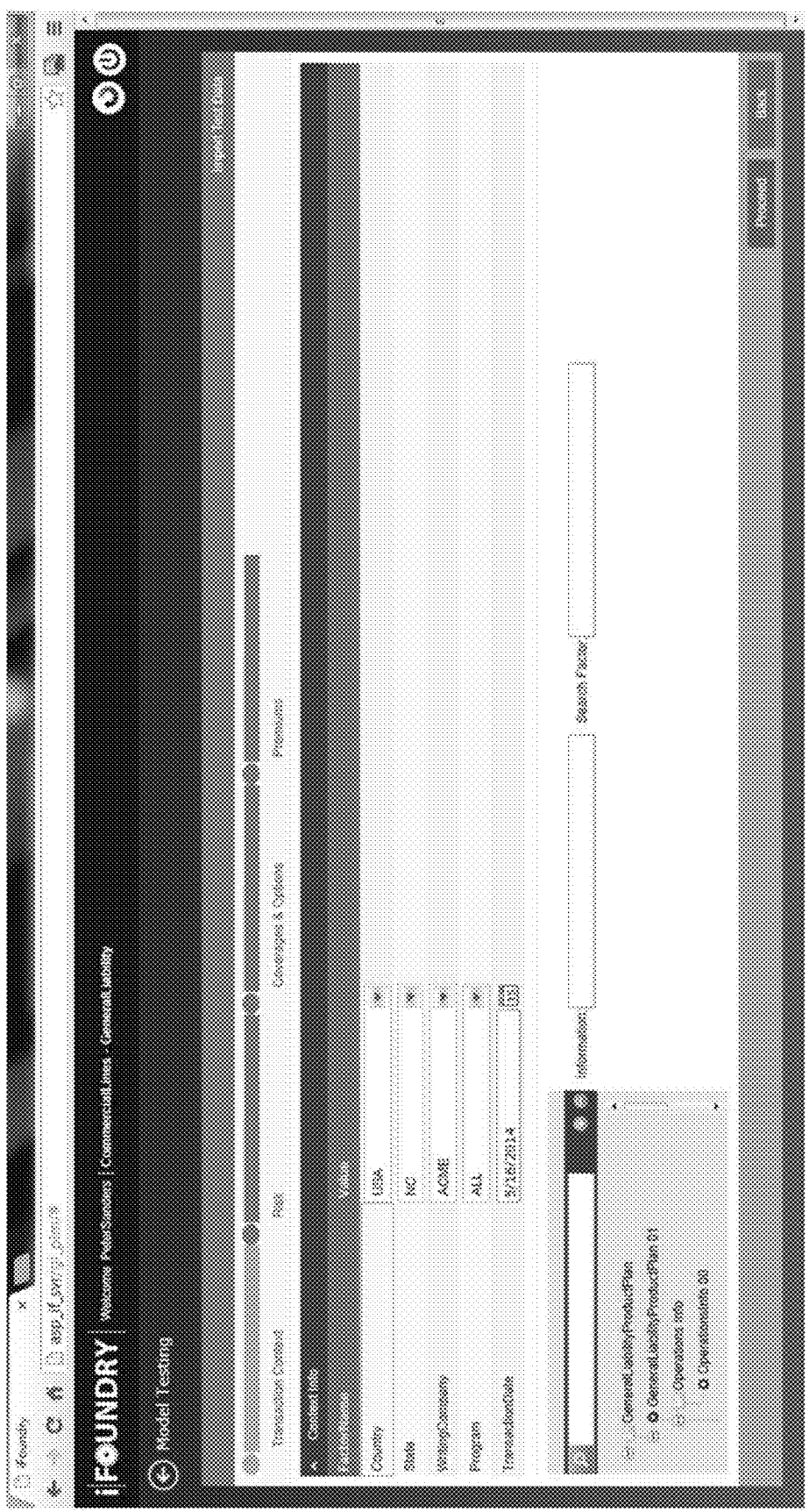

Referring to FIG. 25, a screenshot of the progress of the model testing is shown. In this regard, the dashboard may include a progress bar so that the user may track the product plan model as it is being tested. Further, FIG. 25 shows that the dashboard may provide an interface for the user to verify the information and attribute values entered for each component in the product plan. While the testing my run automatically, the user may manually progress through the product plan model testing using the buttons sown in the bottom, right corner of FIG. 25.

Figure 26:
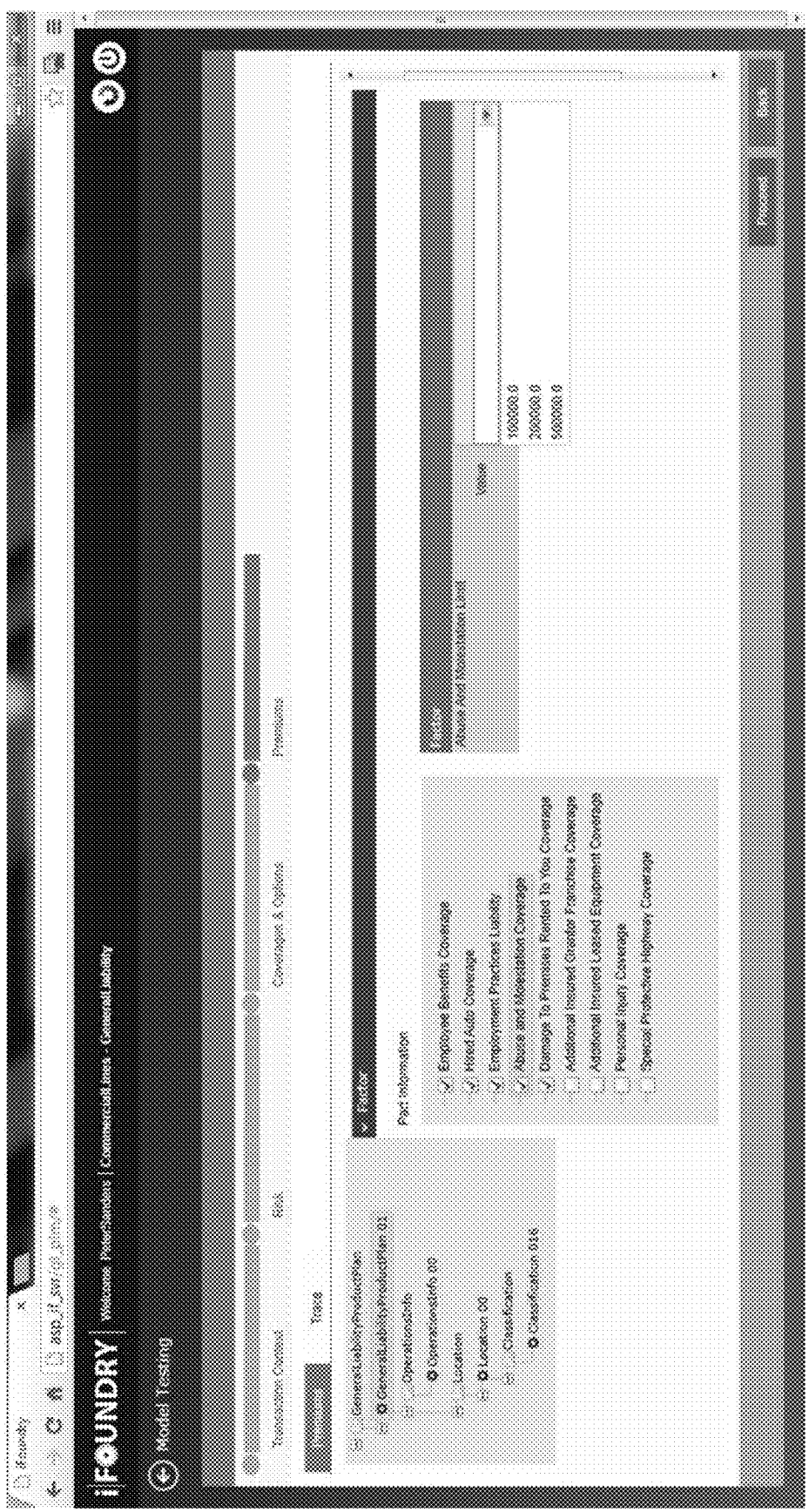

FIG. 26 shows an example of the user manually progressing through the model testing. In this regard, the testing of the model has progressed to checking the "Coverages and Options." At this stage of the testing, the user may verify that the appropriate coverages are part of the model plan using the checklist. Further, the user may be able to remove or delete coverages that should not have been included. Additionally, the user may change or verify the factor attribute value associated with the various coverages. That is, the user may be able to select a coverage and specify a limit on that value. As shown in FIG. 26, the "Abuse and Molestation Coverage" has been selected. The dashboard may provide an additional sub-window to allow the user to set an "Abuse and Molestation Limit" value. FIG. 26 shows that the value may be chosen from a drop-down menu. However, one of ordinary skill in the art would recognize that any technique for entering the value may be used. Once the testing has been completed, the user may proceed to publish the product plan model to an enterprise system.

The product parts, features, and options, referred to in FIG. 26, are rendered from the product structure defined by the system. Based on the product model structure and the modeled product data, a testing environment may render a user experience to capture user inputs to test the model. In this regard, the screens may be rendered dynamically based on the created model.

Figure 27:
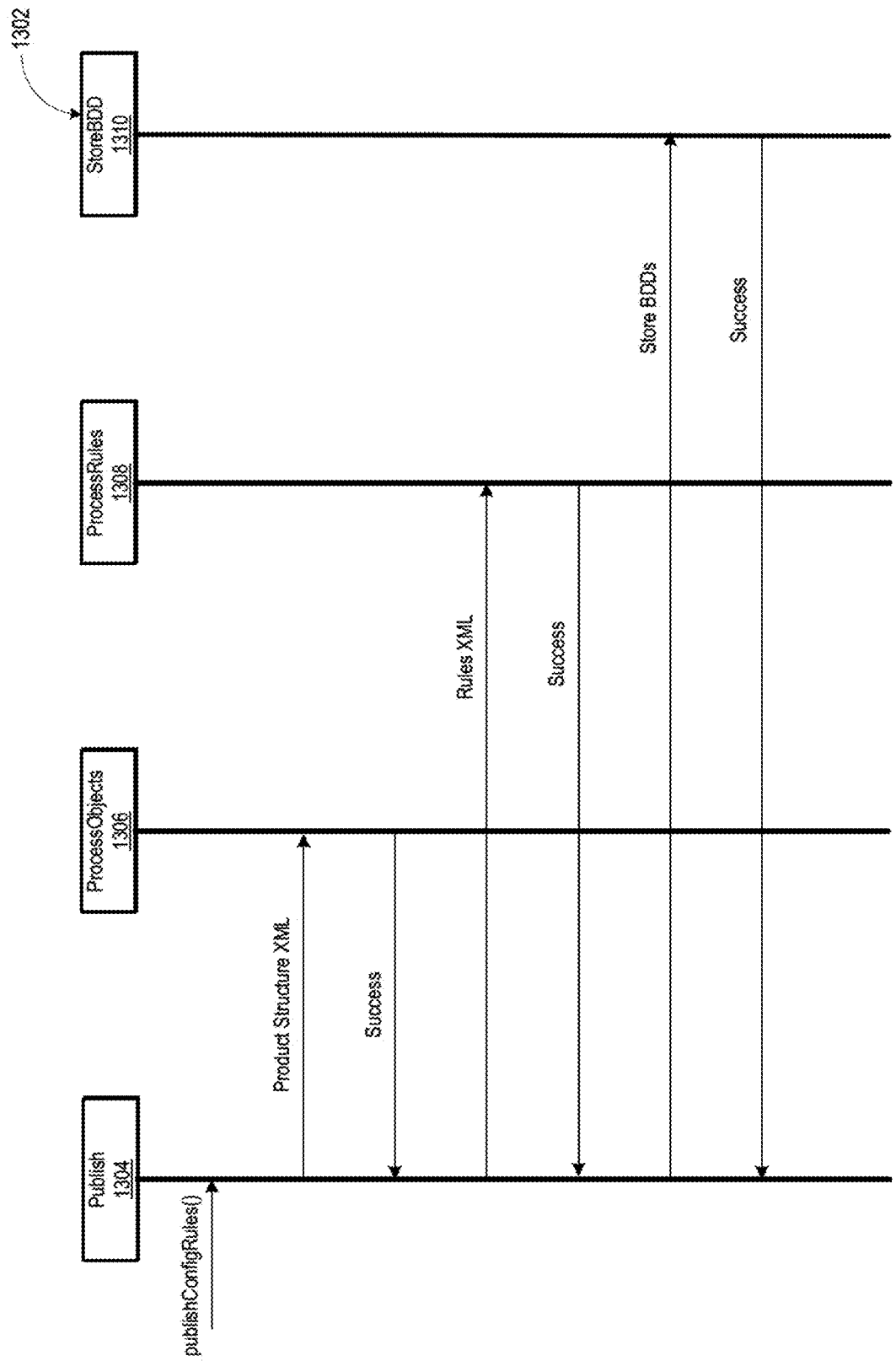
FIG. 27 illustrates a flowchart of publishing a configurable product.

FIG. 27 illustrates one example of a logic flow 1302 for a publishing process between the modeling workbench 116 and the enterprise server 120. In one implementation, the logic flow 1302 includes a publish operation 1304, a process objects operation 1306, a process rules operation 1308, and a store product attribute operation 1310. Other operations may also be possible.

The publishing process may begin with the publish operation 1304, which may include receiving an initiation request for publishing one or more entities, such as a product configuration rule, a configurable product, or other entity. Many of the operations 1306-1310 operate within the scope of the publish operation 1304. In one implementation, when the other operations 1306-1310 have completed, the application that initiated the publish operation 1304 may receive a response indicating the success or failure of the publish operation 1304.

In response to the publish operation 1304 (i.e. initiation request), the process objects operation 1306 may be performed. In this regard, the process objects operation may include gathering one or more structure details regarding the configurable product or product configuration rule from the initiation request, transforming the structure details into objects, such as XML files, and then sending the objects on for further processing. Examples of structure details include product attributes/entities, relations between one or more product attributes, possible attribute values for the product attributes, and other product structure information.

The logic flow 1302 proceeds to the process rules operation in 1308. The process rules operation 1308 may gather one or more product configuration rules and generate product attribute structures for the product attributes that are to participate in the one or more product configuration rules. When a product configuration rule is selected, the product configuration rule may be assessed for the product attributes that participate in the product configuration rule. In one implementation, for each of the product attributes determined to participate in one or more product configuration, a product attribute structure may be created. The product attribute structures may be generated as an XML stream, a flat data stream, objects, or combinations thereof. Once all the rules are processed, a successful message may be returned.

Finally, the logic flow 1302 concludes with the store product attribute operation in 1310. In this regard, the store product attribute structure operation 1310 may store a product attribute structure generated for various product attributes into one or more databases. Storing the product attribute structure may also include generating supporting metadata that may be used for search and retrieval during a service execution phase.

Once a plan is published, either on the product configuration server 110 or the enterprise systems 120, the product plan should be searchable. In this regard, a user of the workbench 116 may perform a search to find a product plan and/or its variants to develop new product plan models to be published on the enterprise systems 120. Alternatively, a user of the enterprise systems 120 may search various product plans to tailor the product plan to the user's preferences or needs.

Figure 28:
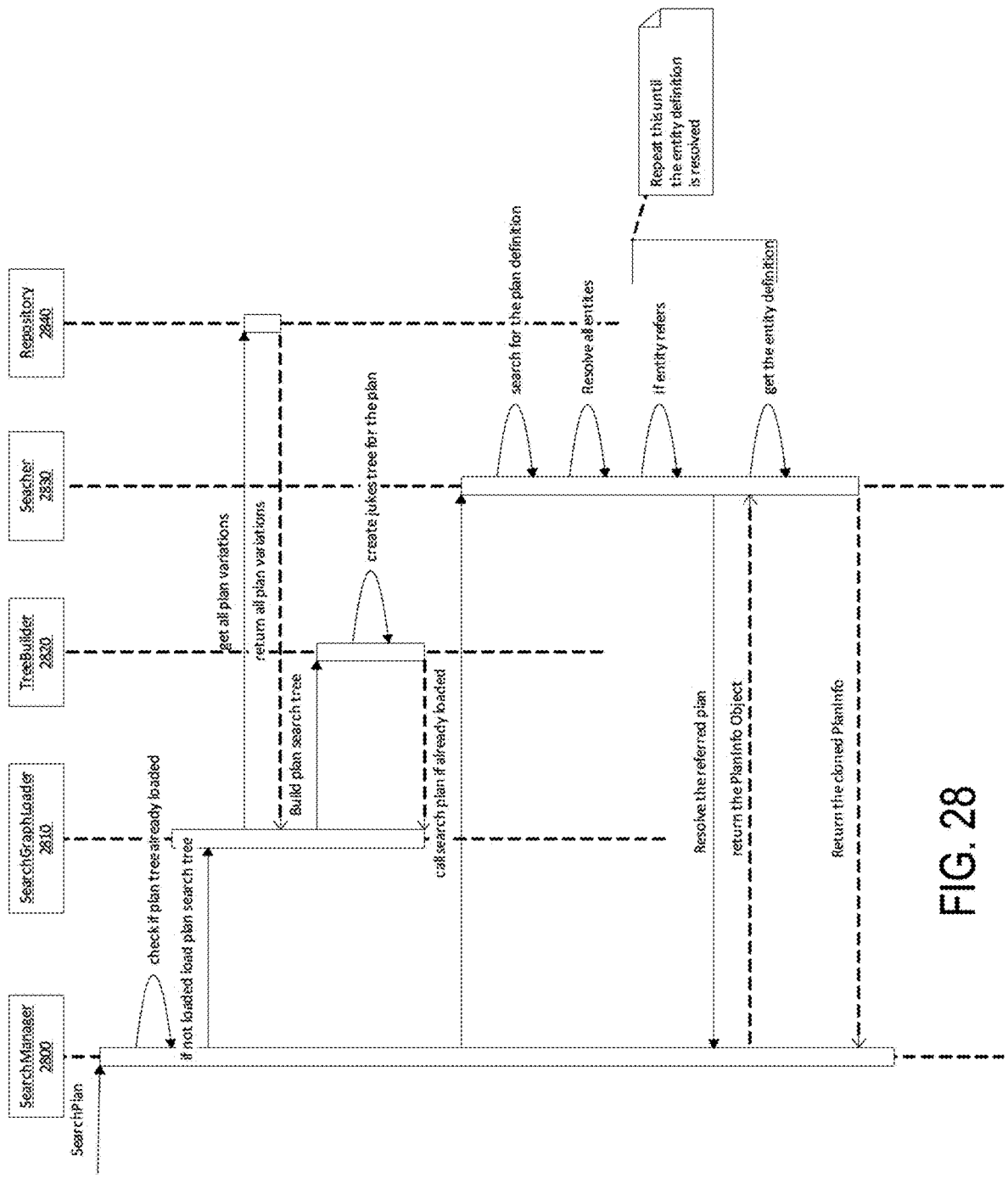
FIGS. 28-29 illustrates a flowchart of searching and configuring a configurable product.

Turning to FIG. 28, a flow chart is provided illustrating an implementation of the searching to be performed by either the user of the workbench 116 or the user of the enterprise system 120. In this regard, the flow chart begins with a user invoking a search manager 2800 to search for the product plan. The search manager will check to see if the plan tree has already been loaded. If the plan tree has not been loaded, then a request is provided to a search graph loader 2810. The mapping between a plan and user context is determined by the system based on provided user inputs.

In this regard, the search graph loader 2810 may request all plan variations from a model repository 2840. The model repository 3950 may provide all plan variations to the search graph loader. The search graph loader may send a request for a tree builder 2820 to build a plan search tree. The tree builder may create a jukes tree for the search plan and provide it to the search graph loader. Jukes tree is a data tree with a search algorithm. The Jukes tree organizes indices to plans, products, features, options, rules, and other elements that have multiple versions, in to a tree structure based on the domain configurations for each of the elements. Once the Jukes tree is defined, the supporting algorithm can effectively search for the right version of an element based on the domains and search request. When a search is made for a part or rule, the system may request that the jukes engine search and return the appropriate version of the part or rule. The Jukes engine will always return the most appropriate version of a component based on the domain configurations and effective dates. The Jukes engine returns indices to the actual element. If necessary, the Jukes engine can return the actual element. In this regard, the calling module may leverage the data returned by the jukes engine to execute the business logic.

If the search plan has already been loaded, then the search plan may be provided to the searcher. The searcher will search for the plan definition that matches the search plan provided by the search manager. The searcher may resolve all entities matching the search plan. The entities that match the search plan are referred to the search manager.

If there are multiple plans referred, the search manager may return the plan info object. The searcher may then use the plan info object to retrieve the entity definition. The steps of resolving the plan definitions, referring them to the search manager, and getting the entity definition may be repeated until the entity definition is resolved. In this regard, entity refers to product parts, features, options, rules, and any other element that represents a product. Once the entity definition is resolved, a copy of the plan information may be provided to the search manager.

Figure 29:
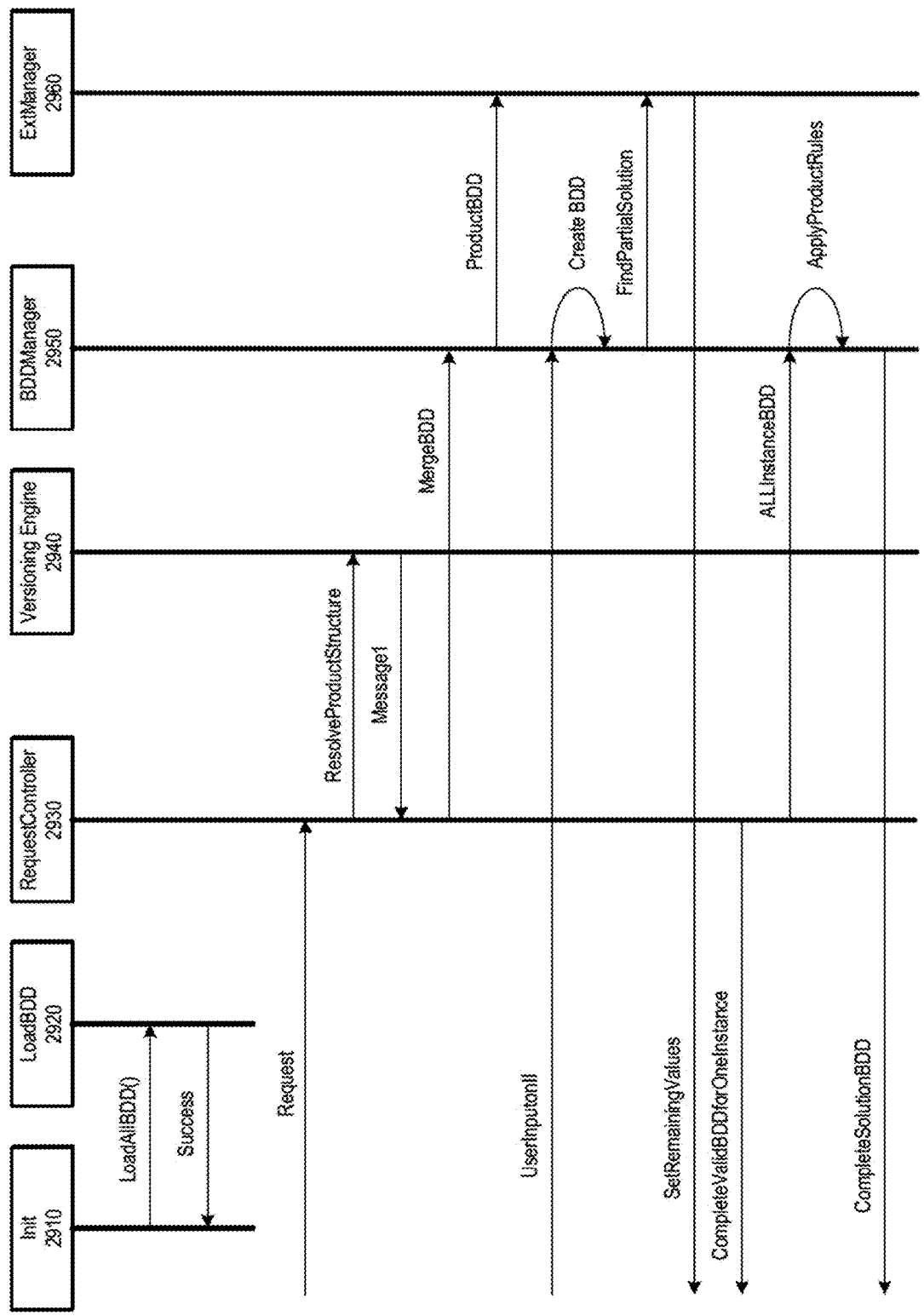

Turning to FIG. 29, a flow chart is provided illustrating an implementation of loading a complete solution using a binary decision tree. Initially, an initialization 2910 may occur which requests all of one or more attribute binary decision diagram (BDD) structures representative of product attributes for a configurable product. In one implementation, the processor 206 is operative to generate the one or more attribute BDD structures. However, any other component of the product configuration server 110 may also generate the one or more attribute BDD structures. The BDD structures may be loaded and a successful loading confirmation may be sent, as shown in 2920.

A request for specific product attributes may then be received by a request controller 2930. The request controller 2930 may request that a versioning engine 2940 provide the available product structures, based on available versions of the product. In response the versioning engine 2940 may resolve/determine the available versions of the product attributes to the request controller 2930 and message the available versions to the request controller 2930. The request controller 2930 may then send a merge request to the BDD Manager, to merge the available product attribute with a product. The BDD manager 2950 may then provide the product, with product attribute to the external manager 2960. Based on further user input, the BDD Manager 2950 may create a BDD which includes further product attributes by finding partial solutions available and sending those to the External manager 2960. The remaining values which need to be determined may then be output. After setting the remaining values the complete BDD for a single instance may be output. The request controller 2930 may then request the BDD manager 2950 apply product rules to the complete BDD. After the rules are applied a complete solution BDD may be output.

The above-described systems may be implemented in software, hardware, or a combination of software and hardware. The systems, logic, and/or modules may be implemented in a computer programming language, such as C# or Java, or any other computer programming language now known or later developed. The systems, logic, and/or modules may also be implemented in a computer scripting language, such as JavaScript, PHP, ASP, or any other computer scripting language now known or later developed. Furthermore, one or more of the systems, logic, and/or modules may be implemented using a combination of computer programming languages and computer scripting languages.

Furthermore, the systems may be implemented with additional, different, or fewer components. As one example, a processor or any other logic or component may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems.

Logic, such as programs or circuitry, may be combined or split among multiple programs, distributed across several memories and processors, and may be implemented in or as a function library, such as a dynamic link library (DLL) or other shared library. The DLL, for example, may store code that implements functionality for a specific module as noted above. As another example, the DLL may itself provide all or some of the functionality of the system.

Moreover, one or more networks may be implemented as any combination of networks. A network may be a WAN, such as the Internet; a LAN; a Personal Area Network ("PAN"), or a combination of WANs, LANs, and PANs. Moreover, a network may involve the use of one or more wired protocols, such as SOAP; wireless protocols, such as 802.11a/b/g/n, Bluetooth, or WiMAX; transport protocols, such as TCP or UDP; an Internet layer protocol, such as IP; application-level protocols, such as HTTP, a combination of any of the aforementioned protocols, or any other type of network protocol now known or later developed.

Interfaces between the systems and the logic and modules within systems may be implemented in numerous ways. For example, interfaces between systems may be Web Services, Simple Object Access Protocol, or Enterprise Service Bus interfaces. Other examples of interfaces include message passing, such as publish/subscribe messaging, shared memory, and remote procedure calls.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims. Furthermore, while certain operations and functions are shown in a specific order, they may be performed in a different order unless it is expressly stated otherwise.

The invention claimed is:

1. A computer-implemented method for configuring a financial product comprising:
   storing, by a first computing device at a first location, a portion of a first financial product and one or more rules associated with the portion of the first financial product;
   storing, by a second computing device at a second location, different from the first location, a portion of a second financial product and one or more rules associated with the portion of the second financial product;
   providing, by the first computing device, in response to a first product configuration request, the portion of the first financial product and the one or more rules associated with the portion of the first financial product;
   providing, by the second computing device, in response to a second product configuration request, the portion of the second financial product and the one or more rules associated with the portion of the second financial product; and
   verifying, by one or more other computing devices located at a third location, the portion of the first financial product and the portion of the second financial product provided in response to the first and second product configurations requests satisfy the one or more rules associated with the portion of the first financial product and the one or more rules associated with the second financial product.

2. The method of claim 1, wherein the financial product represents a tangible or intangible object document.

3. The method of claim 1, wherein the portion of the first financial product and the portion of the second financial product include one or more of product configurations, pricing rules, metadata services, or rule services.

4. The method of claim 1, further comprising:
   providing, by a third computing device, the portion of the first financial product to the first computing device; and
   providing, by a fourth computing device, the portion of the second financial product to the second computing device.

5. The method of claim 4, wherein the portion of the first financial product and the portion of the second financial product are provided through one or more files.

6. The method of claim 4, wherein the third and fourth computing device are the same device.

7. The method of claim 1, wherein the portion of the first financial product is another portion of the second financial product.

8. The method of claim 7, wherein prior to providing the portion of the first financial product, the first computing device retrieves at least part of the another portion of the second financial product from the second computing device.

9. The method of claim 8, wherein providing the portion of the first financial product includes providing the another portion of the second financial product in addition to the portion of the first financial product.

10. A system comprising:
    one or more computing devices; and
    memory storing instructions, the instructions executable by the one or more computing devices, wherein the instructions comprise:
    storing, by a first computing device at a first location, a portion of a first financial product and one or more rules associated with the portion of the first financial product;
    storing, by a second computing device at a second location, different from the first location, a portion of a second financial product and one or more rules associated with the portion of the second financial product;
    providing, by the first computing device, in response to a first product configuration request, the portion of the first financial product and the one or more rules associated with the portion of the first financial product;
    providing, by the second computing device, in response to a second product configuration request, the portion of the second financial product and the one or more rules associated with the portion of the second financial product; and
    verifying, by one or more other computing devices at a third location, the portion of the first financial product and the portion of the second financial product provided in response to the first and second product configurations requests satisfy the one or more rules associated with the portion of the first financial product and the one or more rules associated with the second financial product.

11. The system of claim 10, wherein the portion of the first financial product includes one or more clauses.

12. The system of claim 10, wherein the instructions further comprise:
    providing, by a third computing device, the portion of the first financial product to the first computing device; and
    providing, by a fourth computing device, the portion of the second financial product to the second computing device.

13. A non-transitory computer-readable medium storing instructions, which when executed by one or more processors, cause the one or more processors to:
    store, by a first computing device at a first location, a portion of a first financial product and one or more rules associated with the portion of the first financial product;
    store, by a second computing device at a second location, different from the first location, a portion of a second financial product and one or more rules associated with the portion of the second financial product;
    provide, by the first computing device, in response to a first product configuration request, the portion of the first financial product and the one or more rules associated with the portion of the first financial product; and
    provide, by the second computing device, in response to a second product configuration request, the portion of the second financial product and the one or more rules associated with the portion of the second financial product; and
    verify, by one or more other computing devices at a third location, the portion of the first financial product and the portion of the second financial product provided in response to the first and second product configurations requests satisfy the one or more rules associated with the portion of the first financial product and the one or more rules associated with the second financial product.

14. The non-transitory computer-readable medium of claim 13, wherein the financial product represents a tangible or intangible document.

15. The non-transitory computer-readable medium of claim 13, wherein the portion of the first financial product and the portion of the second financial product include one or more of product configurations, pricing rules, metadata services, or rule services.

16. The non-transitory computer-readable medium of claim 13, further comprising:

providing, by a third computing device, the portion of the first financial product to the first computing device; and providing, by a fourth computing device, the portion of the second financial product to the second computing device.

17. The non-transitory computer-readable medium of claim 16, wherein the portion of the first financial product and the portion of the second financial product are provided through one or more files.

18. The non-transitory computer-readable medium of claim 16, wherein the third and fourth computing device are the same device.

19. The non-transitory computer-readable medium of claim 13, wherein the portion of the first financial product is another portion of the portion of the second financial product.

20. The non-transitory computer-readable medium of claim 19, wherein prior to providing the portion of the first financial product, the first computing device retrieves at least part of the another portion of the second financial product from the second computing device.

* * * * *